United States Patent [19]

Hagiwara

[11] Patent Number: 5,080,210

[45] Date of Patent: Jan. 14, 1992

[54] VISCOUS COUPLING

[75] Inventor: Makoto Hagiwara, Tokyo, Japan

[73] Assignee: Viscodrive Japan Kabushiki Kaisha, Tokyo, Japan

[21] Appl. No.: 618,159

[22] Filed: Nov. 26, 1990

[30] Foreign Application Priority Data

| Nov. 27, 1989 | [JP] | Japan | 1-304754 |
| Nov. 28, 1989 | [JP] | Japan | 1-306445 |
| Nov. 28, 1989 | [JP] | Japan | 1-306446 |
| Feb. 7, 1990 | [JP] | Japan | 2-26156 |
| Feb. 7, 1990 | [JP] | Japan | 2-26157 |
| Mar. 16, 1990 | [JP] | Japan | 2-26204[U] |
| Apr. 2, 1990 | [JP] | Japan | 2-85002 |

[51] Int. Cl.$^5$ .................... F16D 47/06; F16D 35/00
[52] U.S. Cl. .................... 192/48.3; 192/57; 192/58 B
[58] Field of Search .......... 192/57, 48.3, 58 B, 192/58 C, 35

[56] References Cited

U.S. PATENT DOCUMENTS

| 4,885,957 | 12/1989 | Taureg et al. | 192/57 X |
| 4,899,859 | 2/1990 | Teraoka | 192/57 X |

FOREIGN PATENT DOCUMENTS 3834555 9/1989 Fed. Rep. of Germany .

Primary Examiner—Richard Lorence
Attorney, Agent, or Firm—Toren, McGeady & Associates

[57] ABSTRACT

A viscous coupling comprises first and second torque-transmitting members (1, 2) rotatable relative to each other, defining an operating chamber at least partially filled with a viscous fluid; a plurality of first plates (16) engaging and rotationally fast with the first torque-transmitting member; a plurality of second plates (17) interleaved with the first plates, and rotatably mounted on the second torque-transmitting member (2); clutch plates (18) engaging the second torque-transmitting member and disposed alternately with the second plates; a control member (9) operable to compress the clutch plates axially to clamp the second plates between them, and seals (14, 15) operable between the first torque-transmitting member and the control member and between the second torque-transmitting member and the control member, at sealing surfaces (9A, 2A) which are substantially of equal effective diameter to one another. Because the surfaces are of equal diameter, the pressure of the viscous fluid within the operating chamber does not have any effect on the force exerted by the control member on the clutch plates.

8 Claims, 14 Drawing Sheets

VISCOUS COUPLING

BACKGROUND OF THE INVENTION

1. Field of the Invention

The present invention relates to a viscous coupling for a vehicle and the like, which coupling utilises in action the viscous resistance of a viscous fluid employed therein.

As is well known, a conventional viscous coupling comprises first and second torque-transmitting members rotatably arranged relative to each other, the first and the second torque-transmitting members cooperating in defining an operating chamber at least partially filled with a viscous fluid, a plurality of first plates engaging the first torque-transmitting member to prevent relative rotation of the first plates and the first torque-transmitting member, and a plurality of second plates non-rotatably mounted on the second torque-transmitting member, the second plates being disposed alternately with the first plates in the operating chamber. The viscous resistance of the viscous fluid to rotation of one of the torque-transmitting members to the other of the torque-transmitting members provides a means for transmitting torque between the torque-transmitting members, which torque automatically varies so as to be substantially proportional to a difference in rotational speed between the torque-transmitting members 2. Description of Prior Art The conventional viscous coupling of this type is disclosed in, for example such as Japanese Patent Laid-Open No. 186051/1988 (in Japanese, called Tokkaisho 63-186051), and employed as: a part of a power-transmitting unit interposed between a front-wheel axle and a rear-wheel axle of a four-wheel drive vehicle; or a limited slip differential interposed between opposite wheels of a front-wheel axle of a front-wheel drive vehicle.

When such a conventional viscous coupling is employed in a vehicle with an anti-skid brake system (ABS), the viscous coupling operates to transmit torque corresponding to a difference in rotational speed between a front and rear wheel axle of the vehicle or opposite wheels of each of the wheel axles of the vehicle even when the anti-skid brake system (ABS) of the vehicle is operated. As a result, the wheels of the vehicle interfere with each other in braking force to make it difficult precisely to control a brake fluid pressure of the vehicle, so that the anti-skid brake system (ABS) of the vehicle is prevented from operating normally. This is a problem inherent in the conventional viscous coupling of this type.

In order to resolve the above problem, another Japanese Patent Laid-Open No. 65918/1986 (called Tokkaisho 61-65918) discloses another conventional viscous coupling having a construction in which: an annular disc spring or Belleville spring is interposed between the first plates and/or the second plates so as to separate these plates from each other; and each of the plates is so constructed as to be movable against a resilient force exerted by the annular disc spring under the influence of an external fluid pressure applied to the operating chamber or an external mechanical force exerted by a mechanically controlled pushing element, so that each of the first and the second plates is moved to vary a distance between the adjacent ones of the plates, whereby a torque-transmitting characteristic of the viscous coupling is controlled. In the other conventional viscous coupling, the mechanically controlled pushing element is so constructed as to extend into the operating chamber through a housing of the viscous coupling so as to push the plates through a bearing in the operating chamber which is filled with the viscous fluid, usually a high viscosity silicone oil. However, the silicone oils substantially lack lubricating ability. In addition, the silicone oils are poor in cooling ability so that, in operation, temperatures of the silicone oils filled in the operating chamber of the viscous coupling considerably increase. Consequently, in such another conventional viscous coupling, the bearing mounted in the cooperating chamber filled with the silicone oils is subject to considerable wear in operation and, therefore, shortened service life, which lowers the reliability of the viscous coupling and increases the maintenance cost of the coupling. In addition, in the other conventional viscous coupling, a cylinder of the mechanically controlled pushing element of the viscous coupling is integrally formed with the housing which constitutes a rotary member of the viscous coupling. In case the mechanically controlled pushing element of the viscous coupling is operated by the fluid pressure, a swivel area must be provided in a fluid passage of the viscous coupling between the cylinder and a stationary portion of the coupling, which portion is mounted on the vehicle body. However, it is very difficult to realise a sealing engagement in such swivel area of the other viscous coupling. In other words, since the rotating parts of the viscous coupling vibrate in operation to have a tendency to cause a pressure leakage of the fluid, it is necessary for such swivel area of the fluid passage to employ a sealing means having a complex construction which increases the manufacturing cost of the viscous coupling. Furthermore, in the other conventional viscous coupling, since an actuator of the mechanically controlled pushing element is integrally formed with the housing, the housing which constitutes the rotary member of the viscous coupling gains in weight to increase its moment of interia. Therefore, such heavy-weight housing is disadvantageous in controlling vibrations of the viscous coupling. In addition, in the other conventional viscous coupling, the actuator of the mechanically controlled pushing element is disposed in the housing side, and a pushing force exerted by the pushing element is received by a snap ring fixedly mounted on a hub side. Consequently, when the actuator is energised, contact surfaces, which are perpendicular to an axis of rotation of the viscous coupling and through which contact surfaces the housing and the hub are brought into contact with each other, are subjected to the pushing force exerted by the pushing element, and therefore, wear together so that the housing and the hub are poor in durability. In addition, since the operation conducted by the actuator is performed through the pushing element having been inserted into the operating chamber, a pressure of the viscous fluid filled in the operating chamber increases as the pushing element is moved against the resilient force exerted by the annular disc spring. Further, the pressure of the viscous fluid filled in the operating chamber also increases when a temperature of the operating chamber increases. When the pressure of the viscous fluid filled in the operating chamber increases, a force which is a product of a cross sectional area of the inserted portion of the pushing element and the pressure of the viscous fluid filled in the operating chamber acts on the pushing element so as to expel the pushing element from the operating chamber and, therefore, forms a resistance to the pushing force exerted by the actuator to make it difficult to precisely control the torque-transmitting characteristics of the other conventional viscous coupling. Consequently, in order to overcome such resistance to the pushing force exerted by the actuator, it is necessary for the other conventional viscous coupling to employ a large-sized actuator.

On the other hand, Japanese Patent Laid-Open No. 286836/1987 (called Tokkaisho 62-286836) discloses a conventional viscous coupling system having a construction in which: a viscous coupling is connected in series with a multiple disc clutch to permit or prevent torque to be or from being transmitted; a tightening or clamping force of the multiple disc clutch is so controlled as to control a torque-transmitting characteristic of the whole system; and the multiple disc clutch also serves as a torque limiter. In the above system, since the multiple disc clutch forms a separate unit which is connected in series with the viscous coupling, the whole system has a large dimension in a direction of an axis of rotation of the system, and is very heavy in weight and complex in construction.

Another example of a viscous coupling is disclosed in DE 3834555C. In this previously proposed coupling the plates of one of the sets of plates are not themselves rotationally fast with the respective torque-transmitting member, but have interposed between them rings which are rotationally fast with the member. An actuator is operable on a pressure member to press the plates and rings into frictional engagement with one another, so that the coupling can transmit torque. The arrangement has a disadvantage in that the pressure member causes a change in the volume of the operating chamber of the coupling, and the internal pressure in the chamber influences the force exerted by the pressure member on the plates and intervening rings, changing the torque-transmitting characteristics of the coupling.

SUMMARY OF THE INVENTION

It is an object of the present invention to provide a small-sized, light-weight, simple construction and low cost viscous coupling, the torque-transmitting characteristics of which are precisely controlled in operation.

It is another object of the present invention to provide a low maintenance-cost viscous coupling having a construction comprising a hub, a housing and a bearing all of which are improved in durability.

It is yet another object of the present invention to provide a viscous coupling the rotating parts of which are light in weight and, therefore, advantageous in controlling the vibrations of the viscous coupling.

The above objects of the present invention are accomplished in accordance with a first aspect of the present invention, which provides a viscous coupling comprising:

first and second torque-transmitting members rotatably arranged relative to each other, the first and the second torque-transmitting members cooperating in defining an operating chamber at leas partially filled with a viscous fluid, a plurality of first plates engaging the first torque-transmitting member to prevent relative rotation of the first plates and the first torque-transmitting member, a plurality of second plates rotatably mounted on the second torque-transmitting member, the second plates being disposed alternately with the first plates in said operating chamber, clutch plates engaging the second torque-transmitting member to prevent relative rotation of the second plates and the second torque-transmitting member, the clutch plates being disposed alternately with the second plates in said operating chamber, a control member operable to compress the clutch plates in the direction of the axis of rotation of the coupling to clamp the second plates between said clutch plates to produce a frictional force between the second plates and the clutch plates, and sealing means comprising sliding sealing surfaces provided between the first torque-transmitting member and the control member, and between the second torque-transmitting member and the control member respectively, the sealing surfaces being substantially of equal effective diameter.

A viscous coupling according to the invention has the advantage that, because the sealing surfaces are of equal effective diameter, the forces acting in opposite axial directions on the control member, due to the pressure of the viscous fluid in the operating chamber, are balanced and thus do not influence the operation of the control member. The volume of the operating chamber stays substantially constant.

This and other objects and advantages of the present invention will be clarified to those skilled in the art with reference to the following description and accompanying drawings illustrating preferred embodiments of the present invention according to principles of the present invention.

DESCRIPTION OF PREFERRED EMBODIMENTS

Figure 1:
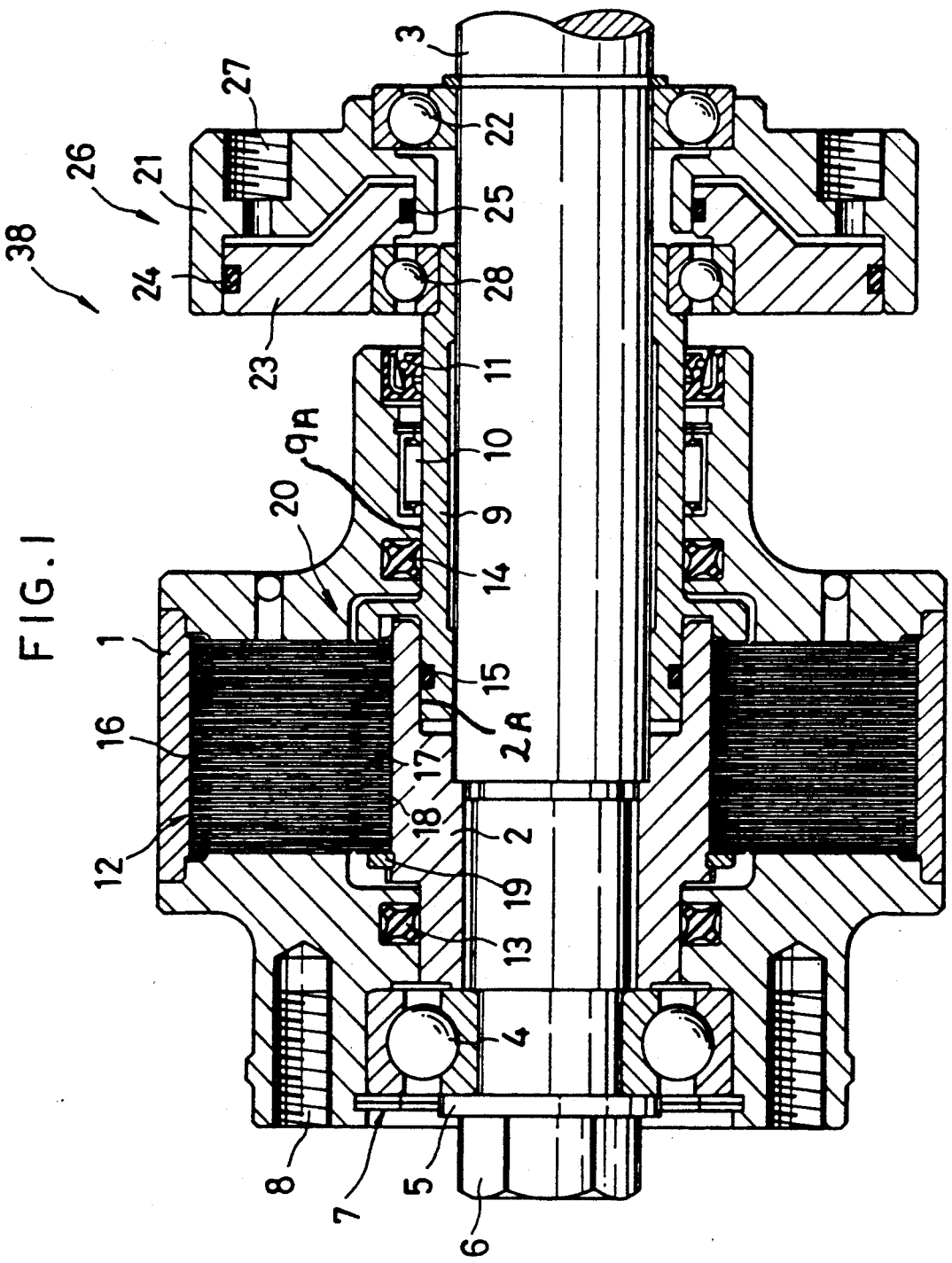
FIG. 1 is a longitudinal sectional view of a first embodiment of a viscous coupling of the present invention.

A first embodiment of a viscous coupling of the present invention will be described with reference to FIGS. 1 to 4. FIG. 4 shows power-train components of a vehicle employing the first embodiment of the viscous coupling of the present invention. In the following description, a right and a left direction as viewed in FIG. 1 are employed to indicate a right and a left direction of the viscous coupling of the present invention, respectively. Incidentally, the left direction of the viscous coupling as viewed in FIG. 1 corresponds to a forward direction of the vehicle shown in FIG. 4.

Now, power-train components of the vehicle employing the first embodiment of the viscous coupling of the present invention will be described in construction with reference to FIG. 4. The power-train components of the vehicle shown in FIG. 4 comprise: an engine 32; a transmission 33; a front differential 34 for a front wheel axle; opposite front wheels 35, 36; a transfer gearbox 37; a viscous coupling 38 of the first embodiment of the present invention; a propeller shaft 39; a rear differential 40 for a rear wheel axle; and opposite rear wheels 41, 42.

The viscous coupling 38 of the first embodiment of the present invention will be described in construction with reference to FIG. 1. In the viscous coupling 38, as shown in FIG. 1, a housing 1 forming a first torque-transmitting member of the viscous coupling 38 is so arranged as to be rotatable relative to a hub 2 of the viscous coupling 38. The hub 2 forms a second torque-transmitting member of the viscous coupling 38, and is splined to a torque-transmitting shaft 3 so that the two must turn together. A bearing 4 is interposed between the housing 1 and the torque-transmitting shaft 3. A lock nut 6 is threadedly engaged with the torque-transmitting shaft 3 through a washer 5 to prevent the bearing 4 from axially moving on the torque-transmitting shaft 3. On the other hand, a retaining ring 7 is fixedly mounted in the housing 1 to retain the bearing 4 in the housing 1 which is in turn connected with a flange portion of the transfer 37 by means of a plurality of bolts each of which is threadably engaged with a threaded bore 8 formed in the housing 1. The torque-transmitting shaft 3 is connected with the propeller shaft 39.

As shown in FIG. 1, a control member 9 is interposed between an inner peripheral surface of the housing 1 and an outer peripheral surface of the torque-transmitting shaft 3 so as to be only axially slidable in relation to both of the housing 1 and the torque-transmitting shaft 3. A bearing 10 and a sealing means 11 such as oil seals are interposed between the control member 9 and the housing 1. In the housing 1, the control member 9 is splined to the hub 2 so that the two must turn together, thereby permitting the control member 9 to be only axially slidable relative to the hub 2.

An operating chamber 12 of the viscous coupling 38 is defined by the housing 1, hub 2 and the control member 9, which contains a viscous fluid such as a high viscosity silicone oil. Sealing means such as X rings 13 and 14 (which are sealing rings like O rings, but of X-shaped cross section in solid material filament) are interposed between: the housing 1 and the hub 2; and the housing 1 and the control member 9, respectively. In addition, another sealing means such as an O ring 15 is carried by the control member 9 and engages an internal surface 2A of the hub 2. Consequently, the operating chamber 12 is liquid-tight sealed with these sealing means 13, 14, 15. The X-ring 14 carried by the housing 1 engages an outer surface 9A on the control member 9, and the effective diameter of the surface 9A is the same as that of the sealing surface 2A of the hub 2.

Figure 2:
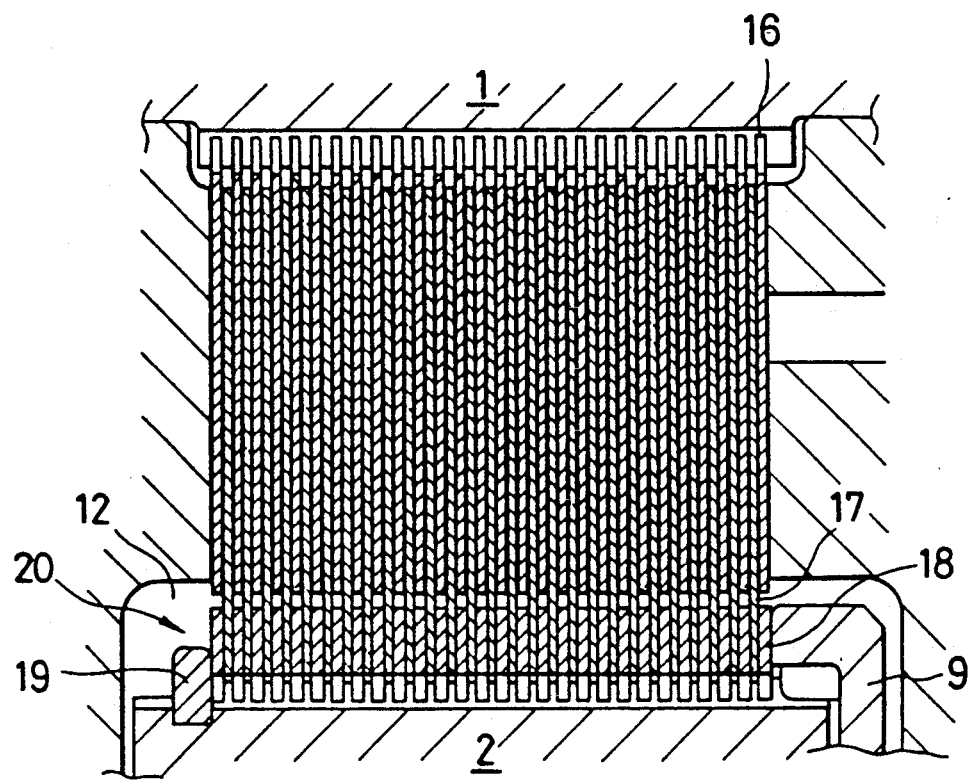
FIG. 2 is an enlarged view of an essential part of the viscous coupling of the present invention shown in FIG. 1.

As is clear from the enlarged view in FIG. 2 illustrating the essential part of the viscous coupling 38, in the operating chamber 12 of the viscous coupling 38, a plurality of first plates or outer plates 16 are spaced alternately with a plurality of second plates or inner plates 17. An outer peripheral surface of each of the outer plates 16 or first plates is splined to an inner peripheral surface of the housing 1 so that the two must turn together, thereby permitting the outer plates 16 to be only axially slidable relative to the housing 1. Therefore, through such splined engagement with the inner peripheral surface of the housing 1, the outer plates 16 are only permitted to slidably move relative to the housing 1 in a direction of an axis of rotation of the housing 1, while prevented from rotating in relation to the housing 1. On the other hand, the inner plates 17 or second plates are movably mounted on an outer peripheral surface of the hub 2 so as to be rotatable relative to the hub 2 and slidable in a direction of an axis of rotation of the hub 2. In addition, inner peripheral portions of the inner plates 17 are spaced alternately with a plurality of clutch plates 18. An inner peripheral surface of each of the clutch plates 18 is splined to the outer peripheral surface of the hub 2 so that the two must turn together. Therefore, through such splined engagement with the outer peripheral surface of the hub 2, the clutch plates 18 are only permitted to slidably move relative to the hub 1 in a direction of an axis of rotation of the hub 2, while prevented from rotating in relation to the hub 2. The extreme leftward one of the clutch plates 18 is oppositely disposed from a right side of a pressure ring 19 which is fixedly mounted on the hub 2. On the other hand, the extreme rightward one of the clutch plates 18 is oppositely disposed from a left side of a pushing portion of the control member 9. The inner plates 17 or second plates and the clutch plates 18 are pressed or clamped between the pressure ring 19 and the control member 9 when the control member 9 is operated, so that the inner plates 17 are frictionally engaged with the clutch plates 18. As is clear from the above, in the viscous coupling 38, its clutch means 20 for connecting the inner plates 17 with the hub 2 is constructed of: the pressure ring 19; inner plates 17; clutch plates 18; hub 2; and the control member 9.

As shown in FIG. 1, an annular cylinder member 21 is fixedly mounted on a vehicle body so as to be: adjacent to a right portion of the housing 1; and coaxial with the torque-transmitting shaft 3. A bearing 22 is interposed between the cylinder member 21 and the torque-transmitting shaft 3 to rotatably support the shaft 3. A piston 23 is slidably mounted in the cylinder member 21 so as to be movable in a direction of an axis of rotation of the torque-transmitting shaft 3 relative to the cylinder member 21. O rings 24, 25 are provided in sliding areas defined between the cylinder member 21 and the piston 23 to fluid-tightly seal such sliding areas, so that a hydraulic actuator 26 is constructed of: the cylinder member 21; O ring 24, 25; and the piston 23. Pressure oil is supplied to a port 27 of the hydraulic actuator 26 from a suitable pressure oil source through a suitable control valve unit. The piston 23 of the hydraulic actuator 26 is connected with the control member 9 through a bearing 28 which is disposed outside the operating chamber 12. Consequently, the hydraulic actuator 26 is rotatably arranged in relation to the housing 1 and the torque-transmitting shaft 3. In operation, pressure oil is supplied to the hydraulic actuator 26 to push the piston 23 axially leftward as viewed in FIG. 1. The thus pushed piston 23 pushes in turn the control member 9 also axially leftward through the bearing 28 to engage the clutch means 20. The hydraulic actuator 26 is automatically operated to respond to steering conditions and road conditions, and disengages the clutch means 20 in braking operation of the vehicle. In addition, the hydraulic actuator 26 may be manually operated by a driver of the vehicle.

As described above, since the cylinder member 21 of the hydraulic actuator 26 is fixedly mounted on the vehicle body, a pressure oil supply line of the hydraulic actuator 26 is free from any swivel motion and therefore easily sealed in construction. In addition, sealed portions of the hydraulic actuator 26 are free from any direct vibrations caused by rotating parts of the viscous coupling 38 and, therefore, free from any leakages of pressure oil. As a result, it is possible for the hydraulic actuator 26 of the viscous coupling 38 to employ low-cost sealing means which are simple in construction.

Further, since the hydraulic actuator 26 is fixedly mounted on the vehicle body, the total moment of inertia of rotating parts of the viscous coupling 38 is minimised, which is advantageous in controlling vibrations of the viscous coupling 38.

Furthermore, as is clear from FIG. 1, since the bearing 28 through which the hydraulic actuator 26 is connected with the control member 9 is disposed outside the operating chamber 12 of the viscous coupling 38, it is possible to sufficiently lubricate and cool the bearing 28, thereby permitting the bearing 28 to increase its durability, which realises higher reliability of the viscous coupling 38.

In construction, as described above with reference to FIG. 1, the outer diameter of the surface 9A of the control member 9 at a position adjoining the right-hand sealing means such as the X ring 14 is substantially identical with the inner diameter of the surface 2A of the hub 2 at a position adjoining the O ring 15. Consequently, in operation, even when the control member 9 is operated, the operating chamber 12 substantially stays constant in its content volume so that a pressure of the viscous fluid filled in the operating chamber 12 substantially stays constant. In addition, the control member 9 is substantially free from any pressure of the viscous fluid filled in the operating chamber 12 in operation, because any axial surfaces of the control member 9 are not subjected to the pressure of the viscous fluid filled in the operating chamber 12. As a result, even when the pressure of the viscous fluid filled in the operating chamber 12 varies under the influence of temperature variations of the viscous fluid, such pressure variation of the viscous fluid substantially does not affect the control member 9 in operation. Consequently, it is possible for the viscous coupling 38 of the present invention to precisely control its torque-transmitting characteristics even when: the control member 9 is operated; or the temperature of the viscous fluid varies; or the pressure of the viscous fluid filled in the operating chamber 12 varies. Such construction of the viscous coupling 38 of the present invention permits the hydraulic actuator 26 to be a small-sized one in dimension.

The viscous coupling 38 functions in the following manner.

When the pressure oil is supplied to a port 27 of the hydraulic actuator 26 of the viscous coupling 38, the control member 9 is axially moved toward the pressure ring 19 to cause the pushing portion of the control member 9 to axially push the clutch plates 18 leftward as viewed in FIG. 1 so that the clutch means 20 is engaged. When the clutch means 20 is engaged, the inner plates 17 are frictionally engaged with the hub 2 through the clutch plates 18 which clamp the inner plates 17 therebetween. The frictional engaging force of the inner plates 17 with the hub 2 substantially corresponds to the clamping force exerted by the clutch plates 18. On the other hand, the housing 1 is rotatably driven by the engine 32. Then, the torque developed by the engine 32, is transmitted from the housing 1 to the outer plates 16 from which the torque is further transmitted to the inner plates 17 through the viscous resistance of the viscous fluid filled in the operating chamber 12, so that the hub 2 is rotated at a speed corresponding to a difference in rotational speed between the outer plates 16 and the inner plates 17. As the difference in rotational speed between the outer plates 16 and the inner plates 17 increases, torque transmitted from the outer plates 16 to the inner plates 17 increases.

Figure 3:
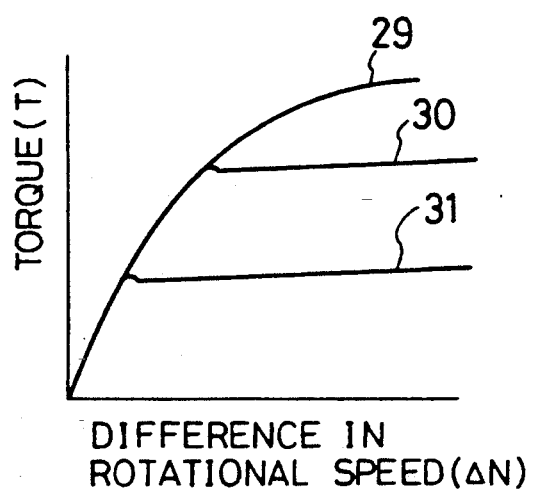
FIG. 3 is a diagram illustrating torque-transmitting characteristics of the viscous coupling of the present invention shown in FIG. 1.
Figure 4:
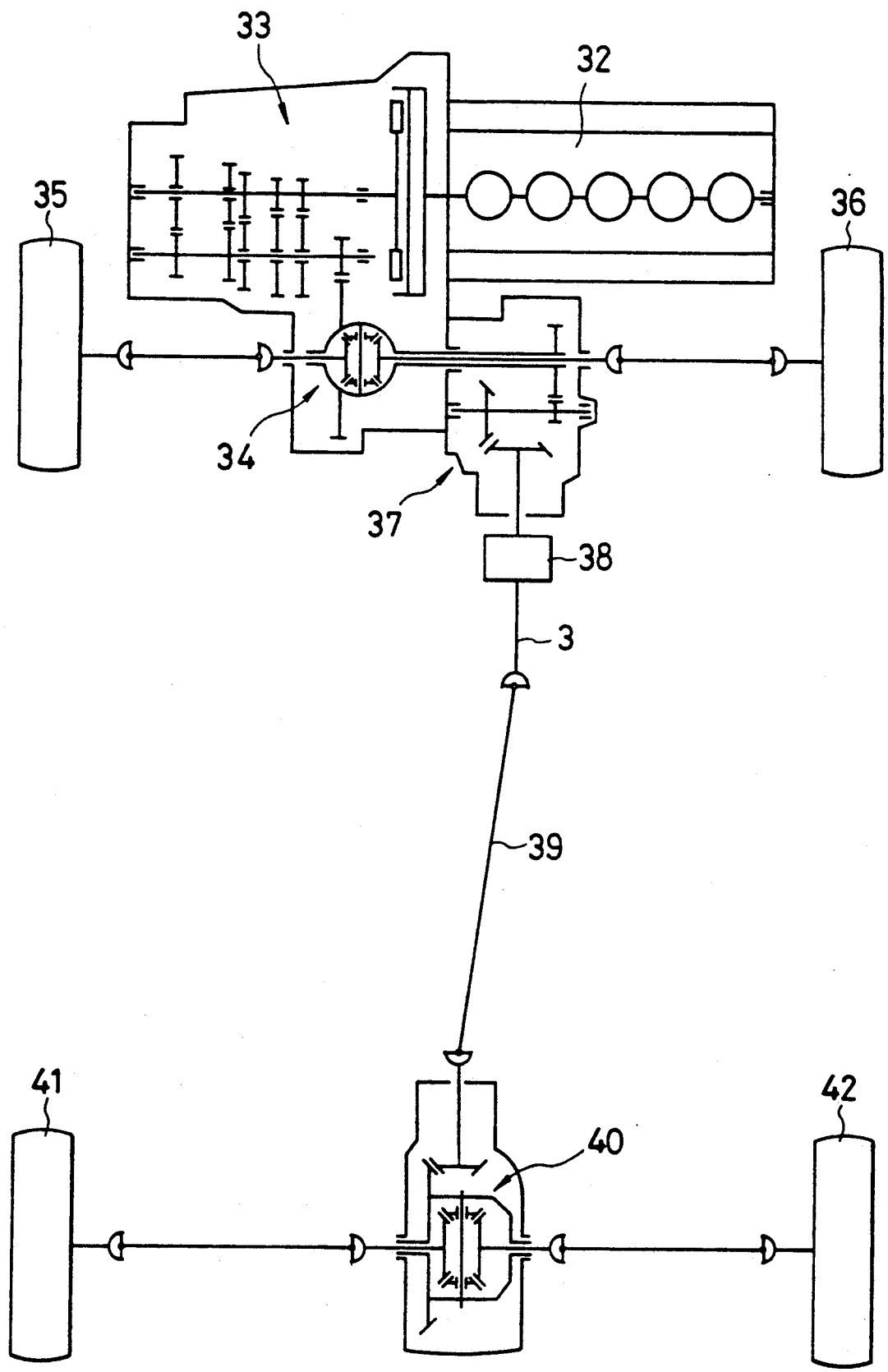
FIG. 4 is an overall schematic view of a vehicle employing the viscous coupling of the present invention shown in FIG. 1, illustrating power-train components of the vehicle.

In operation, when the axial pushing force exerted on the control member 9 by the hydraulic actuator 26 is so sufficiently increased as to engage the clutch means 20 and, therefore, there is no slippage between the inner plates 17 and the clutch plate 18, a difference in rotational speed between the housing 1 and the hub 2 and that between the outer plates 16 and the inner plates 17 become identical with each other to give a graph 29 illustrating the torque-transmitting characteristics of the viscous coupling 38, as shown in FIG. 3. Incidentally, in FIG. 3: a vertical (y) axis indicates the torque (T) transmitted from the housing 1 to the hub 2; a horizontal (x) axis shows the difference in rotational speed ($\Delta N$) between the housing 1 and the hub 2; and the graphs 29, 30, 31 illustrate the torque-transmitting characteristics of the viscous coupling 38 of the present invention.

When the pushing force exerted on the control member 9 by the hydraulic actuator 26 is decreased, the inner plates 17 begin to slip relative to the clutch plates 18 thereby permitting the difference in rotational speed between the outer plates 16 and the inner plates 17 to decrease. As a result, as shown in FIG. 3, the torque T transmitted from the housing 1 to the hub 2 decreases to give the graph 30.

When the slippage of the inner plates 17 relative to the clutch plates 18 is further increased, the torque T transmitted from the housing 1 to the hub 2 further decreases to give the graph 31 as shown in FIG. 3. Eventually, when the control member 9 is completely released from the axial pushing force exerted thereon by the hydraulic actuator 26, the viscous resistance of the viscous fluid such as high viscosity silicone oils sandwiched between the inner plates 17 and the clutch plates 18 in the operating chamber 12 contributes little to transmission of the torque from the housing 1 to the hub 2 to make it impossible to transmit any effective torque to the hub 2 from the housing 1.

As described above, it is possible for the viscous coupling 38 to control its torque-transmitting characteristics by the use of the clutch means 20. Further, when an excessive torque is applied to the housing 1 of the viscous coupling 38, the clutch means 20 of the viscous coupling 38 serves as a kind of torque limiter to permit slippage of the outer plates 16 relative to the inner plates 17. In addition, since the clutch means 20 is incorporated in the viscous coupling 38, it is possible for the viscous coupling 38 to have a simple, light-weight and small-size construction.

It is also possible for the viscous coupling 38 to provide the clutch means 20 between the outer plates 16 and the housing 1. Further, it is also possible for the viscous coupling 38 to employ a right and a left clutch means (20) in place of the single clutch means 20, together with a right and a left hydraulic actuator (26) in place of the single hydraulic actuator 26, the right and the left clutch means (20) being controlled by the right and the left hydraulic actuator (26), respectively.

Now, with reference to FIG. 4, actions of the power-train components of the vehicle provided with the viscous coupling 38 will be described.

The engine 32 of the vehicle develops a torque which is transmitted to the transmission 33 in which the torque is changed in amount. The thus changed torque is further transmitted to the front differential 34 and split therein into two parts being delivered to the opposite front wheels 35, 36.

When the control member 9 of the viscous coupling 38 is operated with a sufficiently large pushing force exerted by the hydraulic actuator 26 to engage the clutch means 20, i.e. when there is no slippage between the inner plates 17 and the clutch plates 18, the torque transmitted from the transmission 33 is split into two parts: one of which is delivered to the opposite front wheels 35, 36; and the other of which is further transmitted to the rear differential 40 through the transfer 37, viscous coupling 38 and the propeller shaft 39 in which the thus split torque is further split into two parts being delivered to opposite rear wheels 41, 42 to put a drive mode of the vehicle in a four-wheel drive mode.

In the four-wheel drive mode, when the vehicle travels roads which are, for example, good in condition, the differences in rotational speed between the front wheels and the rear wheels of the vehicle are so small as to substantially disable the viscous coupling 38 from transmitting the torque to the rear wheels 41, 42, so that the vehicle travels substantially in a two-wheel drive mode to considerably save fuel. On the other hand, when the vehicle travels roads, for example, bad in condition to cause the front wheels 35, 36 to slip on the roads, there are considerable differences in rotation between the front wheels and the rear wheels to enable the viscous coupling 38 to transmit the torque to the rear wheels 41, 42 of the vehicle, so that the vehicle can travel in the four-wheel drive mode which ensures good traction even on such bad condition roads.

In addition, when the vehicle turns on a large radius, there are small differences in rotational speed between the front wheels and the rear wheels. However, such small differences are handled by the viscous coupling 38 so as not to impair smooth turning of the vehicle. On the other hand, when the vehicle turns on a small radius, for example, when the vehicle enters a garage or makes a 180 degree turn, the pushing force exerted on the control member 9 by the hydraulic actuator 26 in the viscous coupling 38 is decreased to permit the inner plates 17 to sufficiently slip relative to the clutch plates 18, so that a tight-corner braking action of the vehicle in the four-wheel drive mode is prevented from occurring.

In the case that the control member 9 of the viscous coupling 38 of the vehicle is completely released from the pushing force exerted thereon by the hydraulic actuator 26 to disengage the clutch means 20, any torque developed by the engine 32 is substantially prevented from being transmitted to the rear wheels of the vehicle regardless of any difference in rotational speed between the front wheels and the rear wheels. Consequently, in this case, the vehicle travels in a two-wheel drive mode and, therefore, no power is delivered to the rear wheels of the vehicle. In braking operation of the vehicle, such disengagement of the clutch means 20 of the viscous coupling 38 is automatically accomplished to prevent the front wheels from interfering with the rear wheels in braking action, so that the anti-skid brake system (ABS) of the vehicle normally functions during braking operation of the vehicle.

Figure 5:
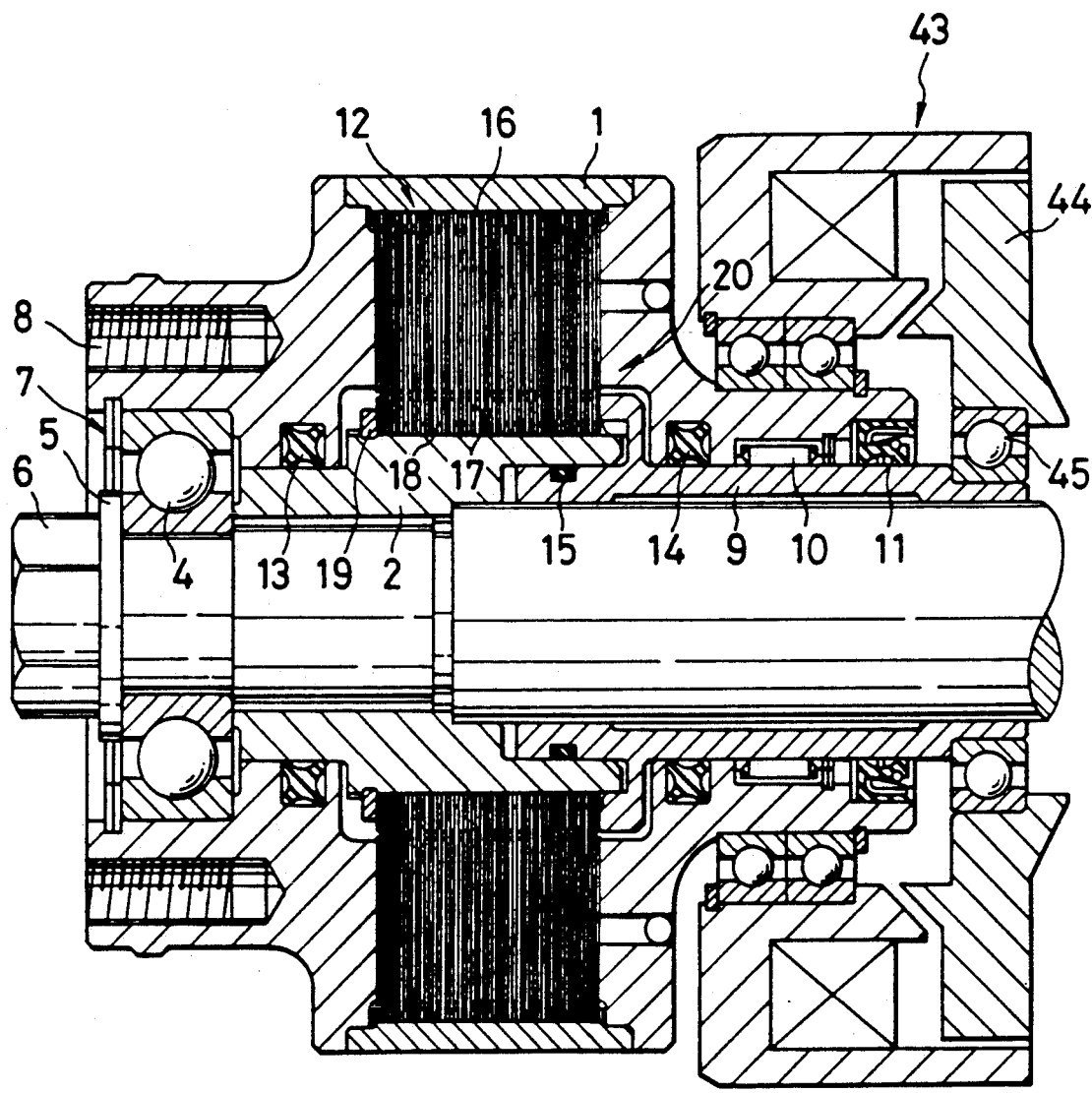
FIG. 5 a longitudinal sectional view of a second embodiment of the viscous coupling of the present invention.

FIG. 5 shows a second embodiment of the viscous coupling 38 of the present invention. As shown in FIG. 5, in the second embodiment of the viscous coupling 38, the hydraulic actuator 26 is replaced with an electromagnetic clutch 43. In operation, when an exciting current is supplied to the electromagnetic clutch 43 of the viscous coupling 38, the electromagnetic clutch 43 attracts its armature disc 44 so that the control member 9 which supports the armature disc 44 through a bearing 45 is axially moved toward the pressure ring 19 to engage the clutch means 20. The remaining construction of the second embodiment of the viscous coupling 38 other than the above construction shown in FIG. 5 is the same as that of the first embodiment of the viscous coupling 38 shown in FIG. 1 and, therefore, is not described again to avoid redundancy in description.

Now, a third embodiment 75 of the viscous coupling of the present invention will be described with reference to FIGS. 6 to 8. FIG. 8 shows power-train components of a four-wheel drive vehicle employing the third embodiment of the present invention.

First of all, with reference to FIG. 8, the power-train components of the vehicle comprises: the engine 32; transmission 33; front differential 34; opposite front wheels 35, 36; transfer 37; propeller shaft 76; viscous coupling 75 of the third embodiment of the present invention; rear differential 40; and opposite rear wheels 41, 42.

Figure 6:
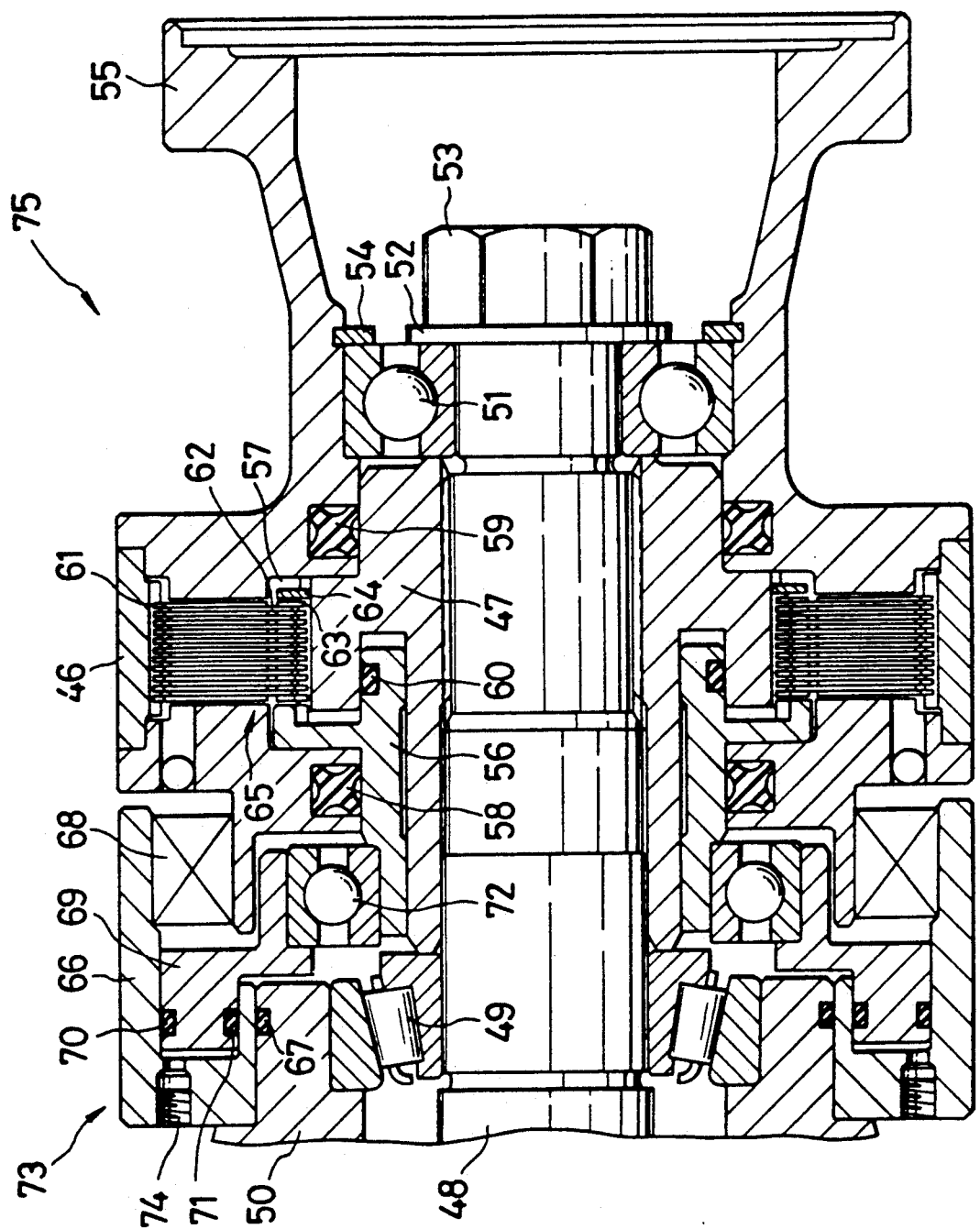
FIG. 6 is a longitudinal sectional view of a third embodiment of the viscous coupling of the present invention.
Figure 7:
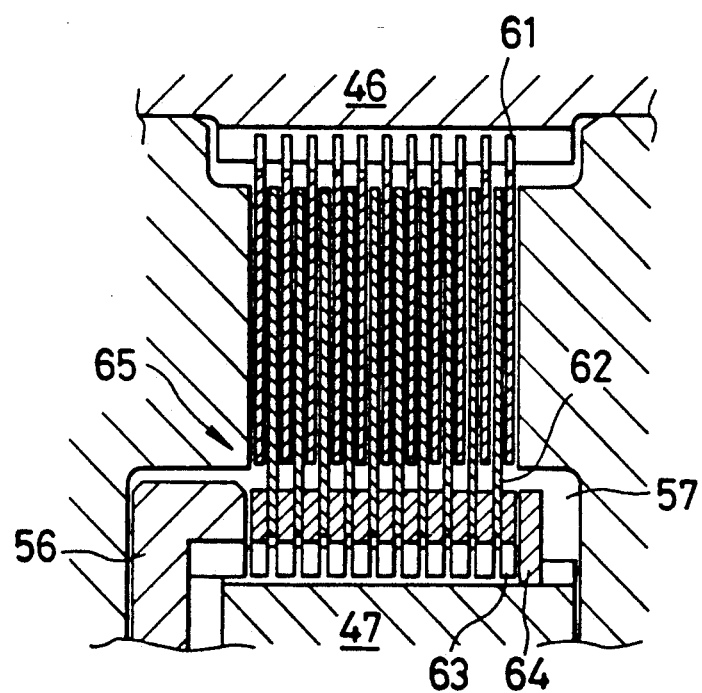
FIG. 7 is an enlarged view of an essential part of the viscous coupling of the present invention shown in FIG. 6.
Figure 8:
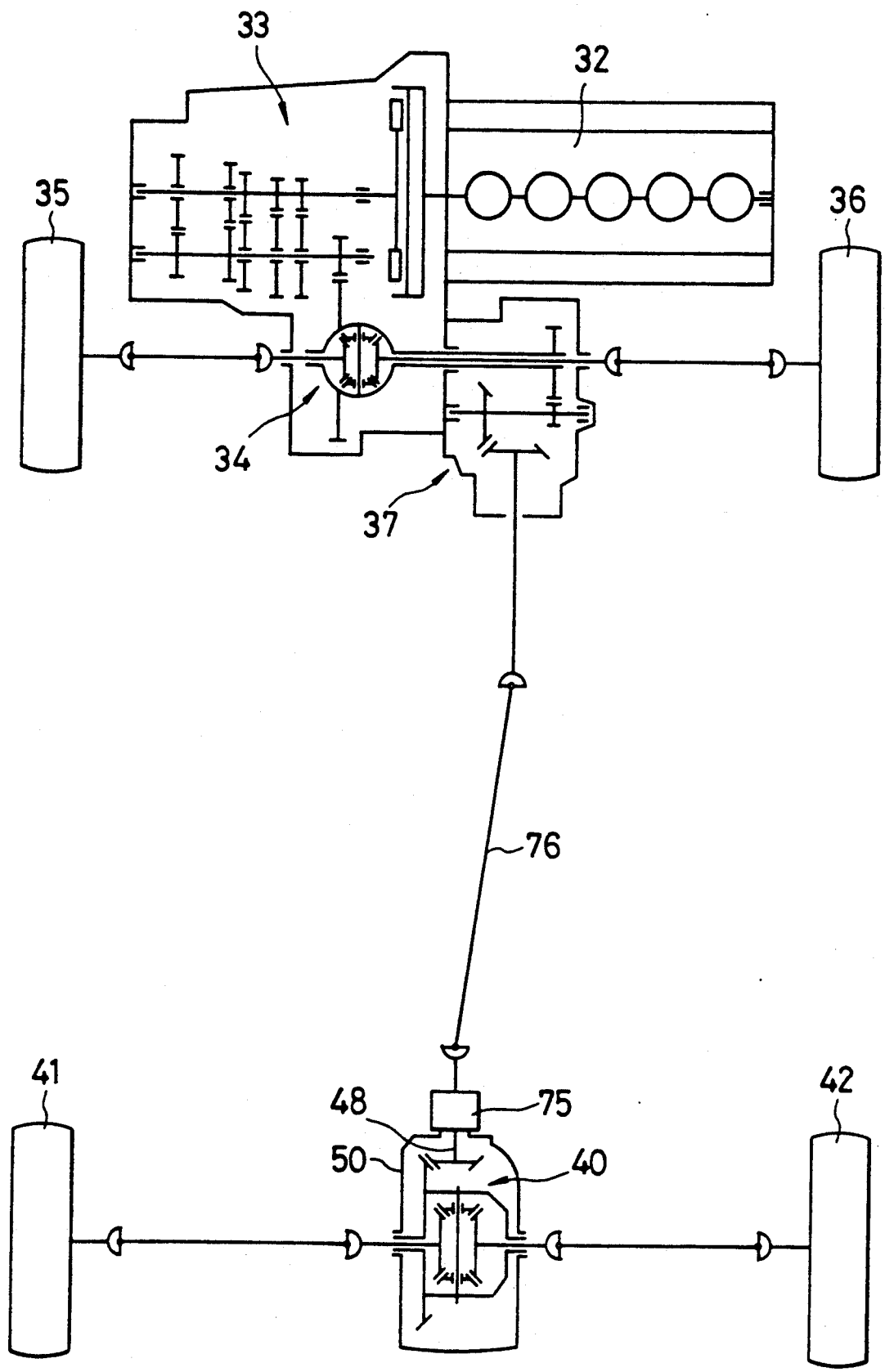
FIG. 8 is an overall schematic view of a vehicle employing the viscous coupling of the present invention shown in FIG. 6, illustrating power-train components of the vehicle.

As shown in FIGS. 6 and 7, the viscous coupling 75 of the third embodiment of the present invention has the following construction.

As shown in FIG. 6, in the viscous coupling 75, the housing 46 is so arranged as to be rotatable relative to the hub 47. An inner peripheral surface of the hub 47 is splined to an outer peripheral surface of a drive-pinion shaft 48 so that the two must turn together. Power is transmitted from the engine 32 to the rear differential 40 through the drive-pinion shaft 48 which is supported by a carrier 50 of the rear differential 40 through a bearing 49. On the other hand, the housing 46 of the viscous coupling 75 is supported by the drive-pinion shaft 48 through a bearing 51 an inner race of which is fixedly mounted on the drive-pinion shaft 48 through a washer 52 and a lock nut 53. The housing 46 is provided with a flange portion 55 through which the housing 46 is connected with the propeller shaft 76 (FIG. 8).

The control member 56 of the viscous coupling 75 is slidably mounted between an inner peripheral surface of the housing 46 and an outer peripheral surface of the hub 47 so as to be only axially movable relative to the hub 47. In addition, the inner peripheral surface of the control member 56 is splined to the outer peripheral surface of a right-hand portion of the hub 47 as viewed in FIG. 6 so that the two must turn together.

As is clear from FIG. 6, in the viscous coupling 75, the operating chamber 57 is defined by the housing 46, hub 47 and the control member 56, while filled with the viscous fluid such as high viscosity silicone oils. X rings 58 and 59 are interposed between: the housing 46 and the control member 56; and the housing 46 and the hub 47, respectively. On the other hand, another sealing means or O ring 60 is interposed between the hub 47 and the control member 56. As a result, the operating chamber 57 is fluid-tightly sealed by these sealing means 58, 59 and 60. The sealing surfaces engaged by the X-ring 58 and the O-ring 60 are of substantially the same effective diameter as one another.

The essential part of the viscous coupling 75 is enlarged in FIG. 7. As shown in this enlarged view, in the operating chamber 57, the outer plates 61 are spaced alternately with the inner plates 62. An outer peripheral surface of each of the outer plates 61 is splined to an inner peripheral surface of the housing 46 so that the two must turn together, thereby permitting the outer plates 61 to be only axially slidable relative to the housing 46 in the operating chamber 57. On the other hand, each of the inner plates 62 is rotatably and axially slidably mounted on the outer peripheral surface of the hub 47. In addition, in the operating chamber 57, inner peripheral portions of the inner plates 62 are spaced alternately with the clutch plates 63 each of which assumes an annular disc shape. An inner peripheral surface of each of the clutch plates 63 is splined to the outer peripheral surface of a large-diameter portion of the hub 47 so that the two must turn together, thereby permitting the clutch plates 63 to be only axially slidable relative to the hub 47. A right side of the extreme rightward one of the clutch plates 63 abuts on the pressure ring 64 which is fixedly mounted on the hub 47. On the other hand, a left side of the extreme leftward one of the clutch plates 63 abuts on a rightward end of the pushing portion of the control member 56. In operation, when the control member 56 is operated, both of the inner plates 62 and the clutch plates 63 are clamped between the pushing portion of the control member 56 and the pressure ring 64 so as to engage the clutch means 65, whereby the inner plates 62 are connected with the hub 47.

An annular cylinder member 66 is coaxially mounted on an outer peripheral surface of a right end portion of the carrier 50 so as to be adjacent to the left side of the housing 46. A sealing means 67 such as an O ring and a sealing means 68 such as an oil seal are interposed between: the cylinder member 66 and the carrier 50; and the cylinder member 66 and the housing 46, respectively. As is clear from FIG. 6, a piston 69 is axially slidably mounted in the cylinder member 66. A space defined between the cylinder member 66 and the piston 69 is fluid-tightly sealed by O rings 70, 71. The hydraulic actuator 73 of the viscous coupling 75 of the third embodiment of the present invention has the above construction.

Pressure oil is supplied from a pressure oil source to a port 74 of the hydraulic actuator 73 through a control valve unit. The piston 69 of the hydraulic actuator 73 is connected with the control member 56 through a bearing 72 which is disposed outside the operating chamber 57. Consequently, the hydraulic actuator 73 is so arranged as to be rotatable relative to the housing 46 and the drive-pinion shaft 48. In operation, the hydraulic actuator 73 axially drives the control member 56 through the bearing 72 rightward as viewed in FIG. 6 so as to engage the clutch means 65. As the pressure of the pressure oil supplied to the hydraulic actuator 73 varies, torque transmitted through the clutch means 65 varies. When the supply of the pressure oil to the hydraulic actuator 73 is stopped, the clutch means 65 is disengaged. The hydraulic actuator 73 of the viscous coupling 75 may be manually controlled by the driver of the vehicle or automatically controlled to correspond to steering conditions of the vehicle and road conditions.

In the viscous coupling 75 shown in FIG. 6, the cylinder member 66 of the hydraulic actuator 73 is fixedly mounted on the carrier 50 which is also fixedly mounted on the vehicle body. Consequently, the pressure oil supply line of the hydraulic actuator 73 of the viscous coupling 75 does not require any swivel joint therein and, therefore, is easily sealed. In addition, since any direct vibrations of the rotating parts of the viscous coupling 75 do not affect the sealed portions of the pressure oil supply line of the hydraulic actuator 73, the viscous coupling 75 of the present invention is free from any leakage of the pressure oil and, therefore, may employ the simple and low-cost sealing means. Further, in the viscous coupling 75, since the hydraulic actuator 73 is fixedly mounted on the vehicle body, the total moment of inertia of the rotating parts of the viscous coupling 75 is small. Such small moment of inertia is advantageous in controlling the vibrations of the viscous coupling 75. Furthermore, since the bearing 72 through which the hydraulic actuator 73 is connected with the control member 56 is disposed outside the operating chamber 57, it is possible to sufficiently lubricate and cool the bearing 72, which contributes to further improving the bearing 72 in durability, whereby the reliability of the viscous coupling 75 is increased.

The viscous coupling 75 of the vehicle functions in the substantially same manner as that of the viscous coupling 38 of the first embodiment of the present invention shown in FIG. 1.

Figure 9:
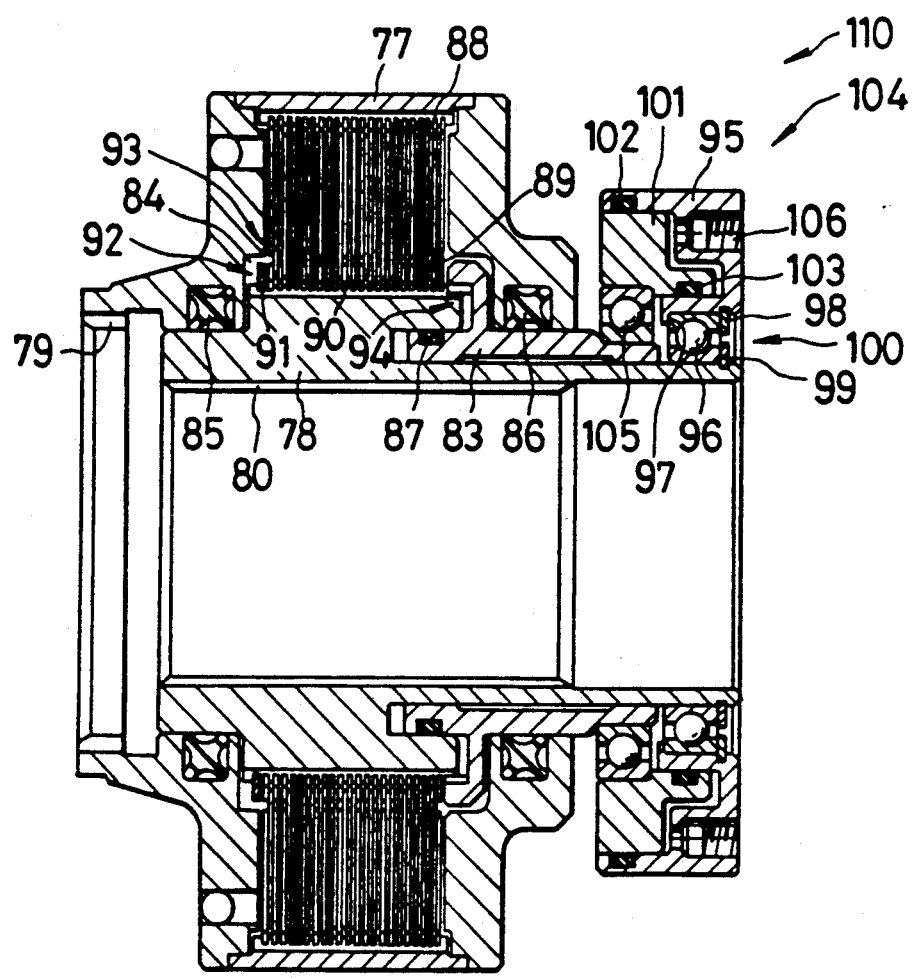
FIG. 9 is a longitudinal sectional view of a fourth embodiment of the viscous coupling of the present invention.
Figure 10:
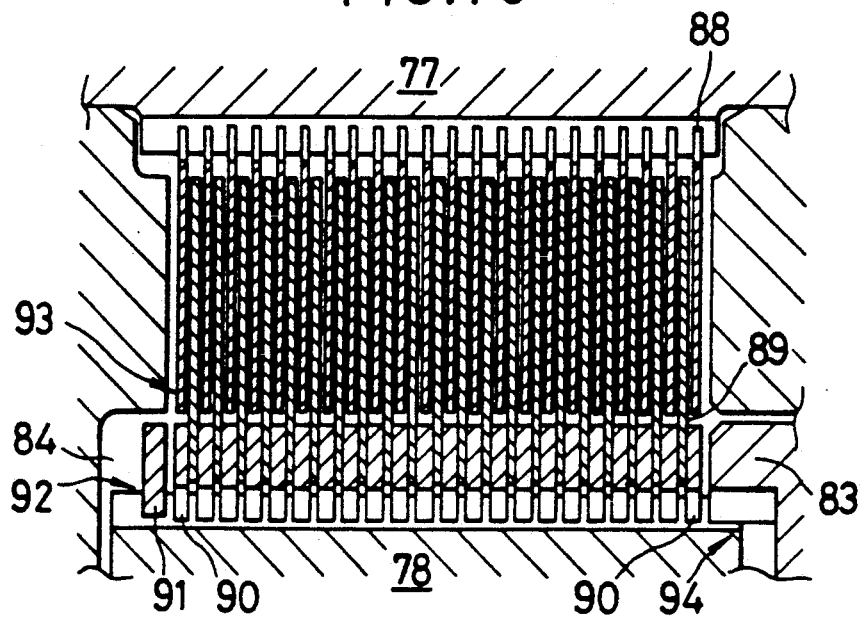
FIG. 10 is an enlarged view of an essential part of the viscous coupling of the present invention shown in FIG. 9.
Figure 11:
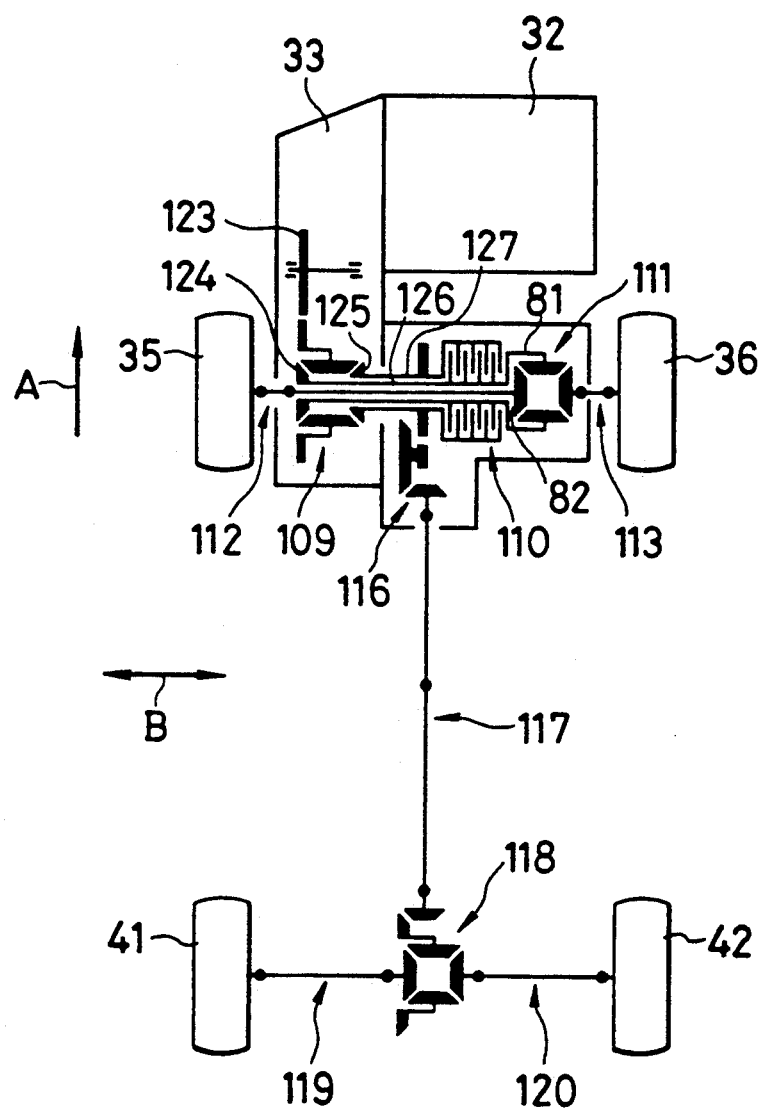
FIG. 11 an overall schematic view of a vehicle employing the viscous coupling of the present invention shown in FIG. 9.

FIGS. 9 and 10 show the viscous coupling 110 of a fourth embodiment of the present invention and FIG. 11 shows power-train components of the four-wheel drive vehicle employing the viscous coupling 110 which will be described hereinbelow.

As shown in FIG. 11, the power-train components of the vehicle employing the viscous coupling 110 of the present invention comprises: the engine 32; transmission 33; centre differential 109; viscous coupling 110; front differential 111; opposite front wheel axles 112, 133; opposite front wheels 35, 36; transfer 116; propeller shaft 117; rear differential 118; opposite rear wheel axles 119, 120; and opposite rear wheels 41, 42.

The torque developed by the engine 32 is transmitted to an output gear 123 of the transmission 33, through which gear 123 the torque is further transmitted to the centre differential 109 in which the torque is split through opposite side gears 124, 125 into two parts being delivered to the opposite front wheel axles 112, 113. The side gears 124 and 125 of the centre differential 109 are fixedly mounted on hollow shafts 126 and 127, respectively. An inner one of the hollow shafts 126, 127 is coaxially disposed inside an outer one of the hollow shafts 126, 127.

The viscous coupling 110 of the fourth embodiment of the present invention has the following construction, as shown in FIGS. 9 to 11.

In the viscous coupling 110, the housing 77 is so arranged as to be rotatable relative to the hub 78. In addition, the housing 77 is splined to the outer hollow shafts 127 so that the two must turn together. The thus splined portion of the housing 77 is denoted by the reference numeral 79 in FIG. 9. On the other hand, the hub 78 is splined to the inner hollow shaft 126 so that the two must turn together. The splined portion of the hub 78 is denoted by the reference numeral 80 in FIG. 9. The hub 78 assumes a hollow shape and is connected with a differential case 81 of the front differential 111. On the other hand, the left-hand front wheel axle 112 passes through the hub 78 and the inner hollow shaft 126, and is connected with the left-hand side gear 82 of the front differential 111.

As is clear from FIG. 9, the control member 83 of the viscous coupling 110 is axially slidably mounted between an inner peripheral surface of the housing 77 and an outer peripheral surface of the hub 78, and axially extends rightward from a right side of the housing 77 as viewed in FIG. 9. The operating chamber 84 of the viscous coupling 110 is defined by the housing 77, hub 78 and the control member 83, while filled with the viscous fluid such as high viscosity silicone oils. Sealing means 85 and 86 such as X rings are interposed between: the housing 77 and the hub 78; and the housing 77 and the control member 83, respectively. On the other hand, another sealing means 87 such as an O ring is interposed between the hub 78 and the control member 84. Consequently, the operating chamber 84 of the viscous coupling 110 is fluid-tightly sealed by these sealing means 85, 86 and 87. The effective diameters of the sealing surfaces engaged by the X-ring 86 and the O-ring 87 are substantially the same as one another.

As shown in the enlarged view in FIG. 10, the outer plates 88 are spaced alternately with the inner plates 89 in the operating chamber 84 of the viscous coupling 110. An outer peripheral surface of each of the outer plates 88 is splined to an inner peripheral surface of the housing 77 so that the two must turn together, thereby permitting the outer plates 88 to be only axially slidable relative to the housing 77. On the other hand, the inner plates 89 are rotatably and axially slidably mounted on an outer peripheral surface of the hub 78. Inner peripheral portions of the inner plates 89 are spaced alternately with the clutch plates 90 in the operating chamber 84 of the viscous coupling 110. Each of the clutch plates 90 assumes a flat annular shape. An inner peripheral surface of each of the clutch plates 90 is splined to an outer peripheral surface of the hub 78 so that the two must turn together, thereby permitting the clutch plates to be only axially slidable relative to the hub 78. The pressure ring 91, which forms a counter member 92 to the pushing force exerted by the control member 83, is fixedly mounted on the hub 78 so as to be oppositely disposed from a left side of the extreme leftward one of the clutch plates 90. On the other hand, the extreme rightward one of the clutch plates 90 is oppositely disposed from a left side of the pushing portion of the control member 83. In operation, when the control member 83 is operated, the inner plates 89 and the clutch plates 90 are clamped between the pressure ring 91 and the pushing portion of the control member 83 so that the clutch means 93 of the viscous coupling 110 is engaged. Incidentally, the control member 83 is splined to the hub 78 so that the two must turn together, thereby permitting the control member 83 to be only axially slidable relative to the hub 78. The thus splined portion of the control member 83 is denoted by the reference numeral 94 in FIG. 10, and contributes to minimizing wear on the sliding surfaces of the O ring 87, hub 78 and the control member 83.

An annular cylinder member 95 is oppositely disposed from a right side of the housing 77 as viewed in FIG. 9, while coaxially and rotatably mounted on the hub 78 through a bearing 96 which is interposed between a rightward portion of the hub 78 and the cylinder member 95. An outer race of the bearing 96 is clamped between an inner shoulder portion 97 of the cylinder member 95 and a retaining ring 98 fixedly mounted on the cylinder member 95, so that the bearing 96 is positioned relative to the cylinder member 95. As shown in FIG. 9, another retaining ring 99 is fixedly mounted on the hub 78 to abut on a rightward side of an inner race of the bearing 96, and forms the counter member 100 of the control member 83.

In the hydraulic actuator 104 of the viscous coupling 110, the piston 101 is axially slidably mounted in the cylinder member 95. Sliding surfaces of the cylinder member 95 and the piston 101 are brought into contact with O rings 102, 103 so that a space defined between the cylinder member 95 and the piston 101 is fluid-tightly sealed by the O rings 102, 103. The hydraulic actuator 104 of the viscous coupling 110 has the above construction.

More specifically, in the hydraulic actuator 104, the piston 101 is connected with the control member 83 through a bearing 105, thereby permitting the piston 101 of the hydraulic actuator 104 to transmit the pushing force exerted by the actuator 104 to the control member 83. When the pressure oil is supplied to a port 106 of the hydraulic actuator 104 from the pressure oil source through a control valve unit, the piston 101 of the hydraulic actuator 104 is axially moved leftward as viewed in FIG. 9 so that the clutch means 93 is engaged. At this time, action and reaction of the pushing force exerted by the hydraulic actuator 104 on the counter members 92 and 100 respectively balance each other on the hub 78.

Consequently, in the viscous coupling 110 shown in FIG. 9, there is no fear that the contact area between the housing 77 and the hub 78 is subjected to the pushing force exerted by the hydraulic actuator 104, which ensures each of the hub 78 and the housing 77 a sufficient durability.

The viscous coupling 110 of the fourth embodiment of the present invention shown in FIG. 9 functions in substantially the same manner as that of the viscous coupling 38 of the first embodiment of the present invention shown in FIG. 1.

Figure 12:
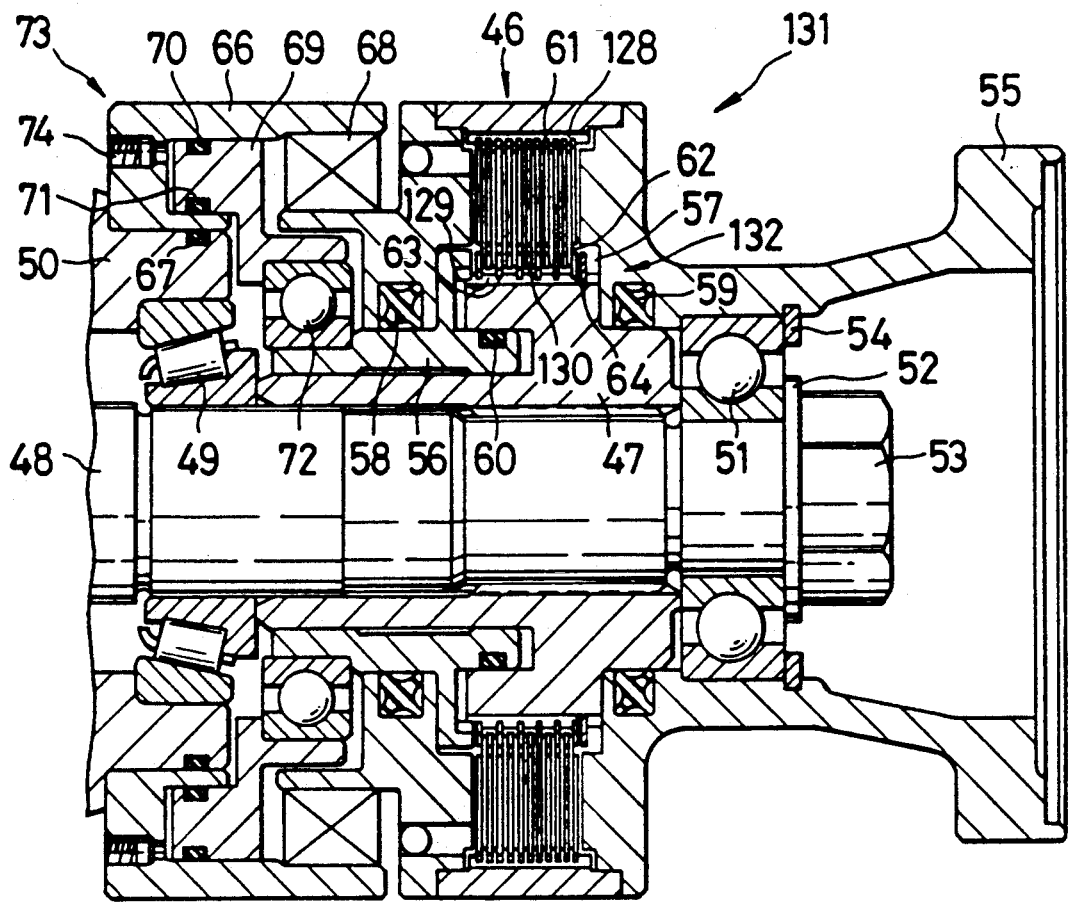
FIG. 12 a longitudinal sectional view of a fifth embodiment of the viscous coupling of the present invention.
Figure 13:
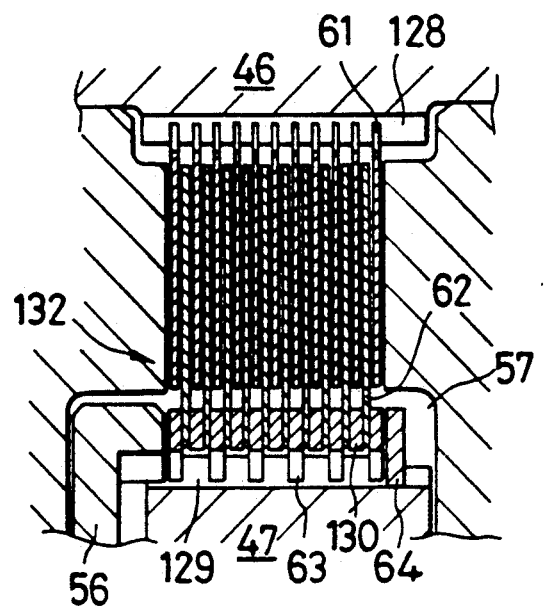
FIG. 13 is an enlarged view of an essential part of the viscous coupling of the present invention shown in FIG. 12.
Figure 14:
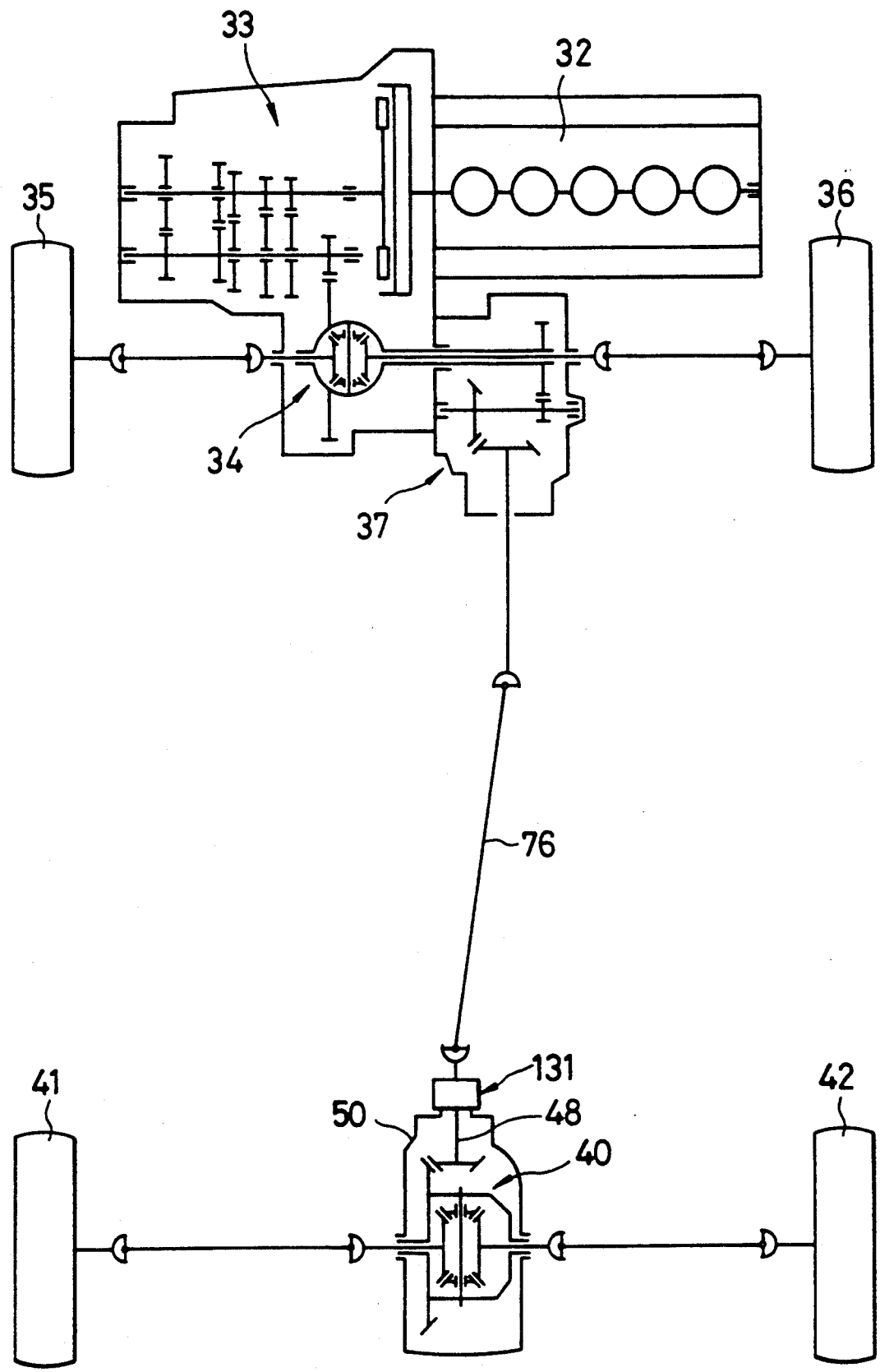
FIG. 14 is an overall schematic view of a vehicle employing the viscous coupling of the present invention shown in FIG. 13, illustrating power-train components of the vehicle.

FIGS. 12 to 14 show the viscous coupling 131 of a fifth embodiment of the present invention. The viscous coupling 131 is employed in the four-wheel drive vehicle the power-train components of which are shown in FIG. 14, and will be described hereinbelow.

As shown in FIG. 14 the power-train components of the four-wheel drive vehicle employing the viscous coupling 131 comprises: the engine 32; transmission 33; front differential 34; opposite front wheels 35, 36; transfer 37; propeller shaft 76; viscous coupling 131; rear differential 40; and the opposite rear wheels 41, 42.

The viscous coupling 131 has the following construction which will be described with reference to FIG. 12 hereinbelow.

In the viscous coupling 131, the housing 46 is so arranged as to be rotatable relative to the hub 47. As is clear from FIGS. 12 to 14, the housing 46 of the viscous coupling 131 is provided with a flange portion 55 through which the housing 46 is connected with the propeller shaft 76. The torque developed by the engine 32 is transmitted to the housing 46 to rotatably drive the same. The hub 47 of the viscous coupling 131 is splined to the drive-pinion shaft 48 of the rear differential 40 so that the hub 47 and the drive pinion shaft 48 must turn together. The drive pinion shaft 48 is supported by the carrier 50 of the rear differential 40 through a bearing 49. On the other hand, the housing 46 is supported by the drive pinion shaft 48 through a bearing 51 an inner race of which is fixedly mounted on the drive pinion shaft 48 by the lock nut 53 through a washer 52, and an outer race of which bearing 51 is fixedly mounted on the housing 46 by a retaining ring 54. The control member 56 is interposed between the housing 46 and the hub 47 so as to be only axially slidable relative to the housing 46 and the hub 47.

The operating chamber 57 of the viscous coupling 131 shown in FIG. 12 is defined between the housing 46, hub 47 and the control member 56, while filled with the viscous fluid such as high viscosity silicone oils. Sealing means such as X rings 58 and 59 are interposed between: the housing 46 and the control member 56; and the housing 46 and the hub 47, respectively. Another sealing means such as an O ring 60 is interposed between the hub 47 and the control member 56. The operating chamber 57 of the viscous coupling 131 is fluid-tightly sealed by these sealing means 58, 59, 60. The effective diameters of the sealing surfaces engaged by X-ring 59 and O-ring 60 are the same as one another.

As shown in the enlarged view in FIG. 13, the outer plates 61 are spaced alternately with the inner plates 62 in the operating chamber 57 of the viscous coupling 131. An outer peripheral surface of each of the outer plates 61 is splined to an inner peripheral surface of the housing 46 so that the two must turn together, thereby permitting the outer plates 61 to be only axially slidable relative to the housing 46. On the other hand, the inner plates 62 are rotatably and axially slidably mounted on an outer peripheral surface of the hub 47. Inner peripheral portions of the inner plates 62 are spaced alternately with the clutch plates 63 and spacers 130 so as to be sandwiched therebetween. Each of the clutch plates 63 is of a flat annular shape. An inner peripheral surface of each of the clutch plates 63 is splined to an outer peripheral surface of the hub 47 so that the two must turn together, thereby permitting the clutch plates 63 to be only axially slidable relative to the hub 47. On the other hand, each of the spacers 130 assumes a flat annular shape, and is rotatably and axially slidably mounted on the outer peripheral surface of the hub 47. As is clear from FIG. 13, the extreme rightward one of the clutch plates 63 is oppositely disposed from a left side of the pressure ring 64 which is fixedly mounted on the outer peripheral surface of the hub 47. On the other hand, a left side of the extreme leftward one of the clutch plates 63 is oppositely disposed from a right side of the pushing portion of the control member 56. In operation, when the control member 56 is operated, the inner plates 62, clutch plates 63 and the spacers 130 are clamped between the pressure ring 64 and the pushing portion of the control member 56 so that the clutch means 132 of the viscous coupling 131 is engaged, thereby permitting the torque to be transmitted from the inner plates 62 to the hub 47.

Furthermore, in operation of the viscous coupling 131 of the fifth embodiment of the present invention shown in FIG. 12, as is in the case of the third embodiment of the viscous coupling 75 of the present invention shown in FIG. 6, the hydraulic actuator 73 disposed leftward relative to the housing 46 as viewed in FIG. 12 applies a clamping force exerted thereby to the clutch means 132 through the bearing 72 and the control member 56 so as to control the engaging force of the clutch means 132, thereby permitting the viscous coupling 75 to control its torque transmitting characteristics.

Figure 15:
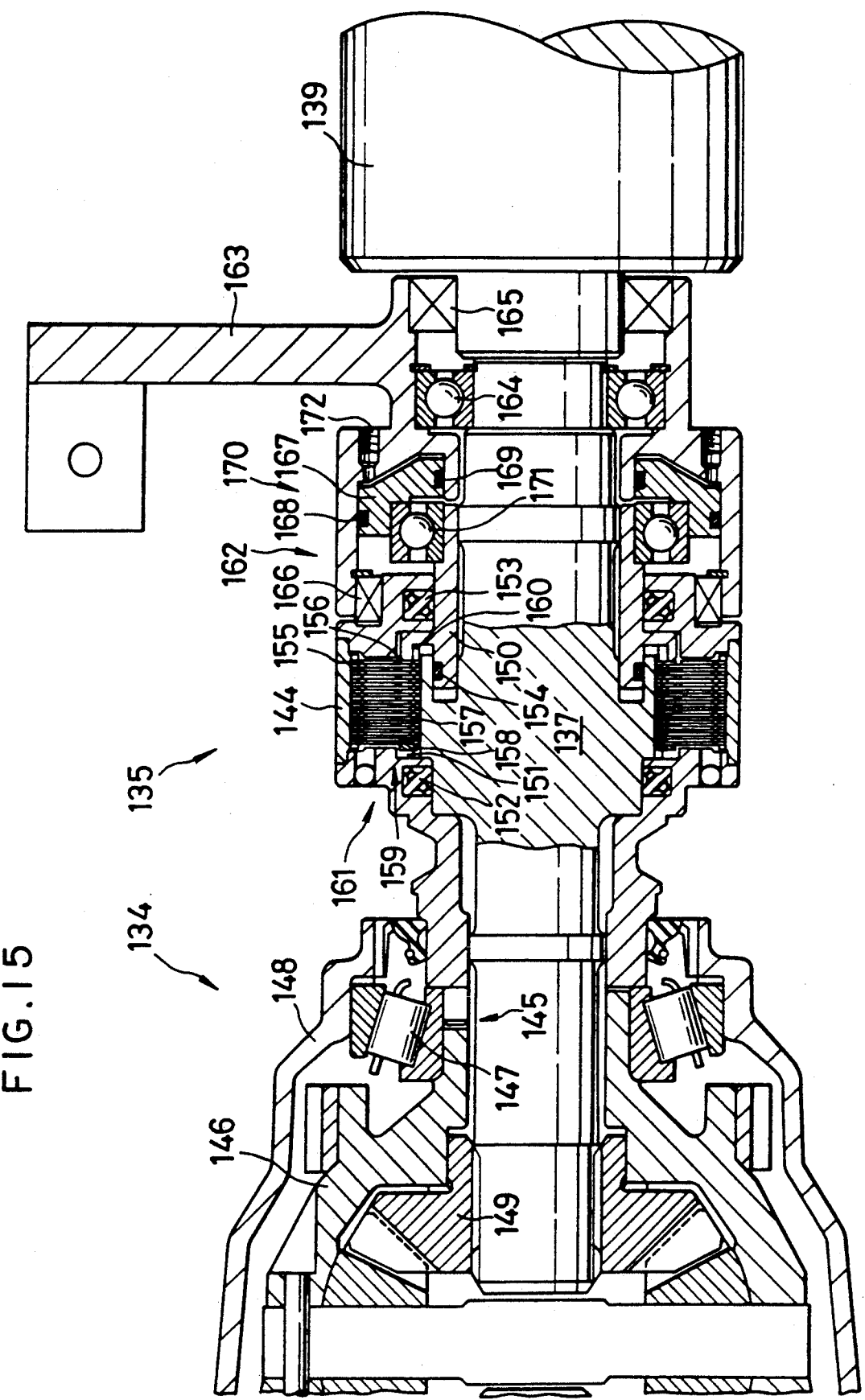
FIG. 15 is a longitudinal sectional view of a sixth embodiment of the viscous coupling of the present invention.
Figure 16:
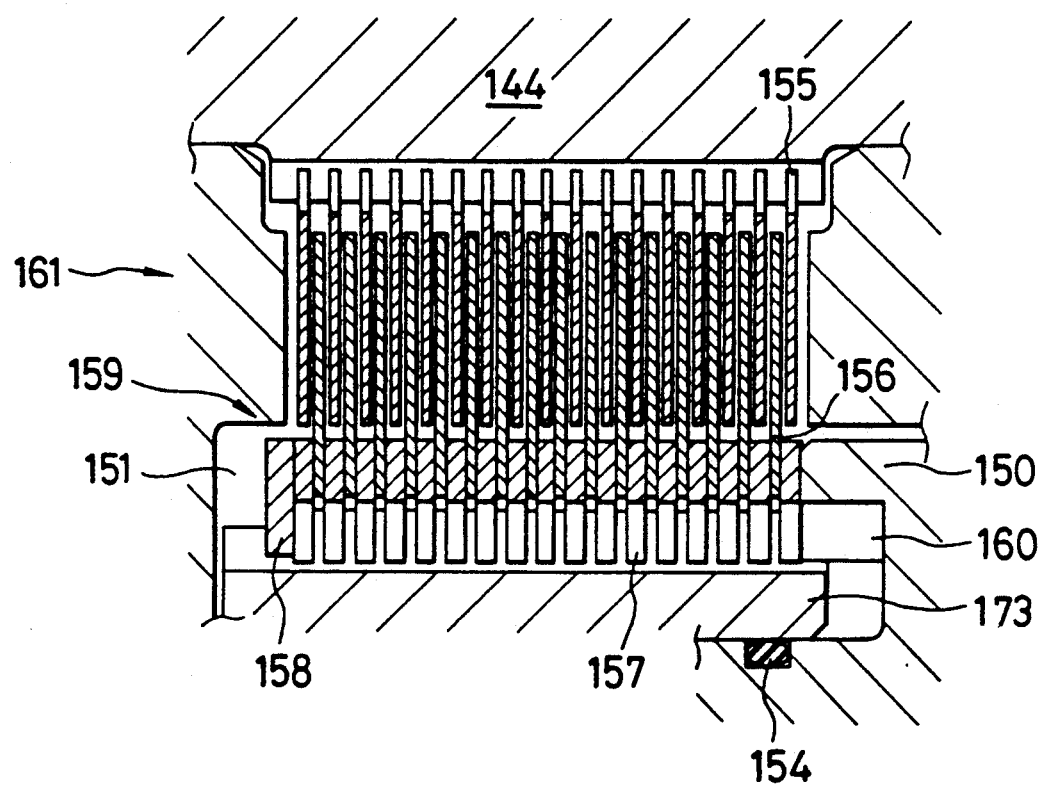
FIG. 16 is an enlarged view of an essential part of the viscous coupling of the present invention shown in FIG. 15.
Figure 17:
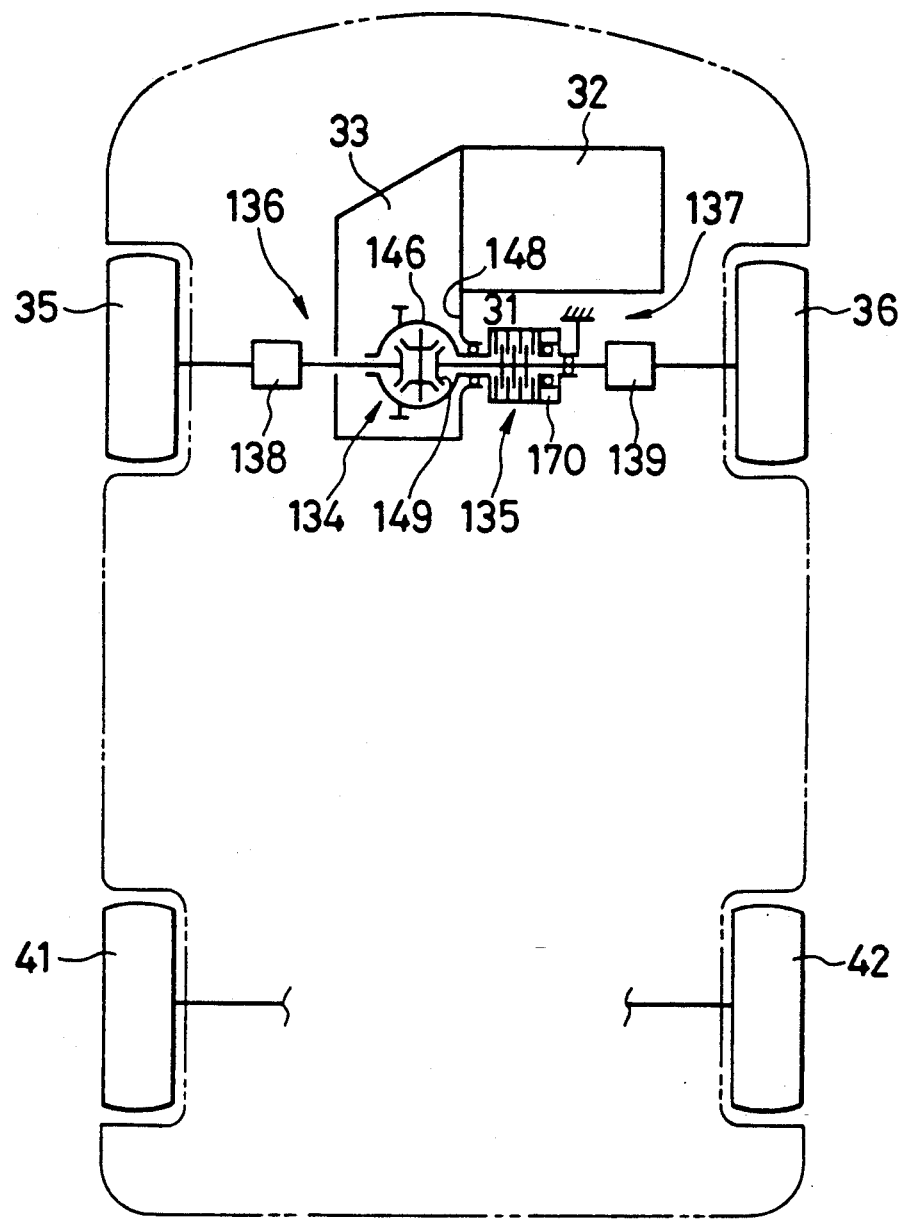
FIG. 17 is an overall schematic view of a vehicle employing the viscous coupling of the present invention shown in FIG. 16, illustrating power-train components of the vehicle.

FIGS. 15 and 16 show a sixth embodiment of the viscous coupling 135 of the present invention. FIG. 17 shows power-train components of a front wheel drive vehicle employing the viscous coupling 135 of the sixth embodiment of the present invention.

First of all, the power-train components of the vehicle shown in FIG. 17 will be described which components comprise: the engine 32; transmission 33; front differential 134; viscous coupling 135; opposite front wheel axles 136, 137; constant velocity universal joints 138, 139; opposite front wheels 35, 36; and the opposite rear wheels 41, 42.

The viscous coupling 135 of the sixth embodiment of the present invention shown in FIG. 15 has the following construction.

The housing 144 of the viscous coupling 135 is rotatably disposed outside the rightward front wheel axle 137 as viewed in FIG. 15, while connected with a differential case 146 of the front differential 134 through a leftward connecting portion 145. Both the differential case 146 and the housing 144 are supported by a transaxle case 148 through a bearing 147. On the other hand, the rightward front wheel axle 137 is splined to a rightward side gear 149 of the front differential 134 so that the axle 137 and the gear 149 must turn together.

The control member 150 of the viscous coupling 135 is interposed between an inner peripheral surface of the housing 144 and an outer peripheral surface of the rightward front wheel axle 137 so as to be only axially slidable relative to the front wheel axle 137. The operating chamber 151 of the viscous coupling 135 is defined by the rightward front wheel axle 137, housing 144 and the control member 150, which is partially filled with the viscous fluid such as high viscosity silicone oils. Sealing means such as X rings 152 and 153 are interposed between: the housing 144 and the rightward front wheel axle 137; and the housing 144 and the control member 150, respectively. On the other hand, another sealing means such as an O ring 154 is interposed between the rightward front wheel axle 137 and the control member 150. The operating chamber 151 of the viscous coupling 135 shown in FIG. 15 is fluid-tightly sealed by these sealing means 152, 153, 154. The X ring 153 and O ring 154 operate at substantially the same effective diameter as one another.

As is clear from the enlarged view shown in FIG. 16, in the operating chamber 151 of the viscous coupling 135, the outer plates 155 are spaced alternately with the inner plates 156. An outer peripheral surface of each of the outer plates 155 is splined to an inner peripheral surface of the housing 144 so that the outer plates 155 and the housing 144, must turn together, thereby permitting the outer plates 144 to be only axially slidable relative to the housing 144. On the other hand, the inner plates 156 are rotatably and axially slidably mounted on an outer peripheral surface of the rightward front wheel axle 137. Further, inner peripheral portions of the inner plates 156 are spaced alternately with the clutch plates 157 each of which is of a flat annular shape. In addition, an inner peripheral surface of each of the clutch plates 157 is splined to the outer peripheral surface of the hub portion 173 of the rightward front wheel axle 137 so that the clutch plates 157 and the front wheel axle 137 must turn together, thereby permitting the clutch plates 157 to be only axially slidable relative to the front wheel axle 137. A left side of the extreme leftward one of the clutch plates 157 as viewed in FIG. 16 is oppositely disposed from the pressure ring 158 which is fixedly mounted on the hub portions 173 of the rightward front wheel axle 137. On the other hand, the extreme rightward one of the clutch plates 157 is oppositely disposed from a leftward side of the pushing portion of the control member 150. In operation, when the control member 150 is operated, the inner plates 156 and the clutch plates 157 are clamped between the pressure ring 158 and the pushing portion of the control member 150 so as to engage the clutch means 159 of the viscous coupling 135, thereby permitting the torque to be transmitted from the inner plates 156 to the front wheel axle 137. The control member 150 is splined to form a splined portion 160. Consequently, the control member 150 is axially slidably connected with the front wheel shaft 137 through such splined portion 160, while prevented from rotating relative to the front wheel axle 137 by the splined portion, thereby permitting the O ring 154 and the front wheel shaft 137 to minimise wear on their contact surfaces.

In operation of the viscous coupling 135 shown in FIG. 15, when the clutch means 159 of the viscous coupling 135 is engaged, a difference in rotational speed between the housing 144 and the front wheel axle 137 is decreased under the influence of the viscous resistance of the viscous fluid such as high viscosity silicone oils sandwiched between the outer plates 155 and the inner plates 156 in the operating chamber 151 of the viscous coupling 135, so that the differential action of the front differential 134 is limited. At this time, as the difference in rotational speed between the housing 144 and the front wheel axle 137 increases, the viscous resistance of the viscous fluid contained in the operating chamber 151 of the viscous coupling 135 also increases. The viscous resistance of the viscous fluid such as high viscosity silicone oils filled in the operating chamber 151 of the viscous coupling 135 serves as a differential limiting force for decreasing a difference in rotational speed between the outer plates 155 and the inner plates 156 in the operating chamber 151 of the viscous coupling 135. Consequently, it is possible for the viscous coupling 135 to control the viscous resistance of the viscous fluid filled in the operating chamber 151 by controlling the clamping force of the clutch means 159, the clamping force being exerted on the inner plates 156 and the clutch plates 157 of the clutch means 159 by the hydraulic actuator 170 of the viscous coupling 135. Namely, when the clutch means 159 of the viscous coupling 135 is engaged, a difference in rotational speed between the outer plates 155 and the inner plates 156 becomes identical with a difference in rotational speed between the housing 144 and the front wheel axle 137, thereby permitting the viscous resistance of the viscous fluid filled in the operating chamber 151 or the differential limiting force for decreasing the difference in rotational speed between the housing 144 and the front wheel axle 137 to reach its maximum value. In operating of the viscous coupling 135, when the pushing force exerted on the clutch means 159 by the hydraulic actuator 170 is decreased to permit the clutch means 159 to begin to slip, the differential limiting force for decreasing the difference in rotational speed between the housing 144 and the front wheel axle 137 begins to decrease. When the clutch means 159 is completely disengaged, such differential limiting force decreases to substantially zero. Consequently, the viscous coupling 135 of the sixth embodiment of the present invention shown in FIG. 15 may serve as a kind of differential limiting device 161 which may control the differential limiting force for decreasing the difference in rotational speed between the housing 144 and the front wheel axle 137 and may decrease such differential limiting force to zero.

In the viscous coupling 135 shown in FIG. 15, an annular cylinder member 162 is coaxially arranged relative to the housing 144, and oppositely disposed from a right side of the housing 144. The cylinder member 162 is provided with a bracket portion 163 through which the cylinder member 162 is fixedly mounted on the vehicle body. The bracket portion 163 of the cylinder member 162 supports the rightward front wheel axle 137 through a bearing 164. The front wheel axle 137 is connected with the constant velocity universal joint 139. A sealing means such as an oil seal 165 is interposed between the bracket portion 163 of the cylinder member 162 and the front wheel axle 137. Another sealing means such as an oil seal 166 is interposed between the housing 144 and a right end portion of the cylinder member 162 as viewed in FIG. 15.

As described above, in the vehicle employing the viscous coupling 135, as shown in FIG. 15, the front wheel axle 137 is supported by the vehicle body through the bracket portion 163 of the cylinder member 162 in the vicinity of the housing 144. Consequently, the front wheel axle 137 is substantially free from any vibration and noise and therefore good in durability. In addition, since the front wheel axle 137 is supported by the use of the bracket portion 163 of the cylinder member 162, it is not necessary for the front wheel axle 137 to have its own support, which contributes to further simplifying of the viscous coupling 135 in construction.

In the viscous coupling 135, the piston 167 is axially slidably mounted in the cylinder member 162. Sealing means such as O rings 168, 169 are interposed between the cylinder member 162 and the piston 167 so as to fluid-tightly seal a space defined by the cylinder member 162 and the piston 167. The hydraulic actuator 170 of the viscous coupling 135 has the above construction. In the hydraulic actuator 170 shown in FIG. 15, the piston 167 is connected with the control member 150 through a bearing 171. The clutch means 159 of the viscous coupling 135 is engaged and disengaged through operation of the control member 150.

In operation of the viscous coupling 135 shown in FIG. 15, the pressure oil is supplied to a port 172 of the hydraulic actuator 170 from a pressure oil source through a control valve unit so as to axially drive the piston leftward as viewed in FIG. 15, whereby the control member 150 is operated. The hydraulic actuator 170 of the viscous coupling 135 may be manually operated by the driver of the vehicle or automatically operated to respond to the steering conditions and road conditions.

Now, with reference to FIG. 17, the function of the viscous coupling 135 employed in the vehicle will be described hereinbelow.

When the engine 32 of the vehicle starts, the engine 32 develops a torque which is transmitted to the transmission 33 in which the amount of the torque is changed. The thus changed torque is transmitted to the front differential 134 and split therein into two parts which are then delivered to the opposite front wheels 35, 36 of the vehicle.

When the clutch means 159 of the viscous coupling 135 is engaged, the differential limiting device 161 limits the differential action of the front differential 134 to prevent the engine 32 from delivering the torque only to a slipping one of the front wheels 35, 36, thereby permitting the vehicle to keep a sufficient traction.

When the clutch means 159 of the viscous coupling 135 is permitted to slip, the differential limiting force decreases to enable the vehicle to make turns easy. In addition, when the clutch means 159 is completely disengaged, the differential limiting force decreases to zero to enable the vehicle to travel a rough road much easier.

I claim:

1. A viscous coupling comprising
   first and second torque-transmitting members rotatably arranged relative to each other, the first and the second torque-transmitting members cooperating in defining an operating chamber at least partially filled with a viscous fluid,
   a plurality of first plates engaging the first torque-transmitting member to prevent relative rotation of the first plates and the first torque-transmitting member,
   a plurality of second plates rotatably mounted on the second torque-transmitting member, the second plates being disposed alternately with the first plates in said operating chamber,
   clutch plates engaging the second torque-transmitting member to prevent relative rotation of the second pates and the second torque-transmitting member, the clutch plates being disposed alternately with the second plates in said operating chamber,
   a control member operable to compress the clutch plates in the direction of the axis of rotation of the coupling to clamp the second plates between said clutch plates to produce a frictional force between the second plates and the clutch plates,
   first sealing means carried by the first torque-transmitting member so as to engage a cylindrical outer surface of the second torque-transmitting member and a cylindrical outer surface of the control member,
   and second sealing means carried by said control member so as to engage a cylindrical internal surface of the second torque-transmitting member, said cylindrical outer surfaces of the second torque-transmitting member and the control member, and said cylindrical internal surface of the first torque-transmitting member being of substantially equal diameter.

2. A viscous coupling according to claim 1, wherein the coupling also comprises
   an actuator for driving said control member, and
   a bearing by which the actuator is connected with said control member.

3. A viscous coupling according to claim 2, wherein said actuator is rotatable relative to the viscous coupling.

4. A viscous coupling according to claim 2, wherein said actuator is hydraulically operated.

5. A viscous coupling according to claim 2, wherein said actuator is an electromagnetic clutch.

6. A viscous coupling according to claim 2, wherein one of said first and said second torque-transmitting members is connected with a wheel axle which is supported by a bearing interposed between said actuator and said wheel axle, said actuator being fixedly mounted on a body of a vehicle employing said viscous coupling.

7. A viscous coupling according to claim 1, wherein said second torque-transmitting member comprises stop means arranged to receive the compressive force exerted by said control member and to provide a reactive force thereto.

8. A viscous coupling according to claim 1, wherein among said clutch plates are spacers which are rotatably mounted on said second torque-transmitting member.

* * * * *